US011604584B2

(12) United States Patent
Akutsu et al.

(10) Patent No.: US 11,604,584 B2
(45) Date of Patent: *Mar. 14, 2023

(54) STORAGE SYSTEM

(71) Applicant: HITACHI, LTD., Tokyo (JP)

(72) Inventors: Hiroaki Akutsu, Tokyo (JP); Akira Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,441

(22) Filed: May 8, 2020

(65) Prior Publication Data

US 2020/0272337 A1    Aug. 27, 2020

Related U.S. Application Data

(63) Continuation of application No. 16/133,039, filed on Sep. 17, 2018, now Pat. No. 10,656,836.

(30) Foreign Application Priority Data

Nov. 20, 2017    (JP) .............................. JP2017-222868

(51) Int. Cl.
*G06F 3/06* (2006.01)
*G06F 11/10* (2006.01)
*G06F 12/02* (2006.01)

(52) U.S. Cl.
CPC .......... *G06F 3/0608* (2013.01); *G06F 3/0638* (2013.01); *G06F 3/0641* (2013.01); *G06F 3/0679* (2013.01); *G06F 11/1048* (2013.01); *G06F 12/0246* (2013.01); *G06F 2212/401* (2013.01); *G06F 2212/403* (2013.01)

(58) Field of Classification Search
CPC .... G06F 3/0608; G06F 3/0641; G06F 3/0638; G06F 2212/401
See application file for complete search history.

(56) References Cited

U.S. PATENT DOCUMENTS

| | | | |
|---|---|---|---|
| 6,389,460 B1* | 5/2002 | Stewart | G06K 9/222 |
| | | | 709/217 |
| 9,922,101 B1* | 3/2018 | Reiner | G06F 16/256 |
| 2004/0088283 A1* | 5/2004 | Lissar | G06F 16/288 |
| 2005/0192961 A1* | 9/2005 | Dittrich | G06F 16/284 |
| 2007/0174536 A1 | 7/2007 | Nakagawa et al. | |

(Continued)

FOREIGN PATENT DOCUMENTS

JP    2007-199891 A    8/2007

OTHER PUBLICATIONS

Japanese Office Action dated Aug. 18, 2020 for Japanese Patent Application No. 2017-222868.

(Continued)

*Primary Examiner* — Joseph D Torres
(74) *Attorney, Agent, or Firm* — Volpe Koenig

(57) ABSTRACT

In write processing of a data set group to be written to be one or more data sets to be written, a storage system performs encoding processing including processing for generating a data model showing regularity of the data set group to be written and having one or more input values as an input and the data set group as an output. In the write processing, the storage system writes the data model generated in the encoding processing and associated with a key of the data set group to be written.

26 Claims, 25 Drawing Sheets

(56) References Cited

U.S. PATENT DOCUMENTS

| | | | | |
|---|---|---|---|---|
| 2008/0189438 A1* | 8/2008 | Zimmerer | ............ | H04L 67/2823 709/246 |
| 2009/0177799 A1* | 7/2009 | Fitzek | ................. | H03M 7/3084 709/247 |
| 2010/0265385 A1* | 10/2010 | Knight | ................... | H04N 5/232 348/340 |
| 2013/0113981 A1* | 5/2013 | Knight | ............... | H04N 5/23212 348/345 |
| 2013/0141448 A1* | 6/2013 | Yokota | ...................... | G06T 1/00 345/522 |
| 2013/0254041 A1* | 9/2013 | Sherwin | ................. | G06Q 30/02 705/14.68 |
| 2013/0325534 A1* | 12/2013 | Fukui | ................. | G06Q 10/0631 705/7.12 |
| 2015/0142734 A1* | 5/2015 | Mueller | ................. | G06F 16/27 707/610 |

OTHER PUBLICATIONS

Takashi Sudo et al., "A Study on ECG Lossless Compression and Power Consumption of Wearable Sensing Device", Proceedings of the 37th Symposium on Information Theory and its Applications (CD-ROM), Proceedings of the 37th Symposium on Information Theory and its Applications (SITA2014), Japan, The Institute of Electronics, Information and Communication Engineers (IEICE), Dec. 2, 2014, pp. 361-366.

\* cited by examiner

STORAGE SYSTEM

CROSS REFERENCE TO RELATED APPLICATION(S)

This application is a continuation of U.S. patent application Ser. No. 16/133,039, filed Sep. 17, 2018, which claims priority to JP Patent Application 2017-222868 filed on Nov. 20, 2017, which are incorporated by reference as if fully set forth.

BACKGROUND OF THE INVENTION

1. Field of the Invention

The present invention relates generally to storage control, for example, reduction of a data amount.

2. Description of the Related Art

A storage system for reducing a data amount is known (for example, refer to JP 2007-199891 A). This type of storage system generally reduces the data amount by compression. As one of existing compression methods, there is known a method of making a character string having a high appearance frequency in a predetermined block unit into a dictionary and replacing the character string with a code with a smaller size, like a run-length method.

SUMMARY OF THE INVENTION

IoT is introduced for industrial purposes or other purposes. Generally, when IoT is introduced, sensor data (for example, time series data of measurement values) from a large number of sensors is stored and a large amount of stored sensor data is analyzed.

To store the large amount of sensor data in limited resources, it is considered that the sensor data is compressed and stored.

However, generally, the sensor data is data with the low possibility that the same value appears consecutively and the sensor data is a kind of data unsuitable for compression by the existing compression methods.

In the future, it is considered that the introduction of IoT progresses and a large number of sensors are used. For this reason, it is considered that the amount of sensor data that needs to be stored further increases and a large amount of storage resources are required.

The data unsuitable for compression by the existing compression methods is not limited to sensor data composed of simple numbers. For example, because data having mixed numerical values and symbols like certain product numbers also has the high possibility that the same values are inconsecutive, the data is unsuitable for compression by the existing compression methods.

It is desirable to reduce a data amount even if data to be written is data unsuitable for compression by existing compression methods.

In write processing of a data set group to be written to be one or more data sets to be written, a storage system performs encoding processing including processing for generating a data model showing regularity of the data set group to be written and having one or more input values as an input and the data set group as an output. The storage system writes the data model generated in the encoding processing and associated with a key of the data set group to be written.

It can be expected that a data mount is reduced even if data to be written is data unsuitable for compression by existing compression methods.

DESCRIPTION OF THE PREFERRED EMBODIMENTS

Figure 1:
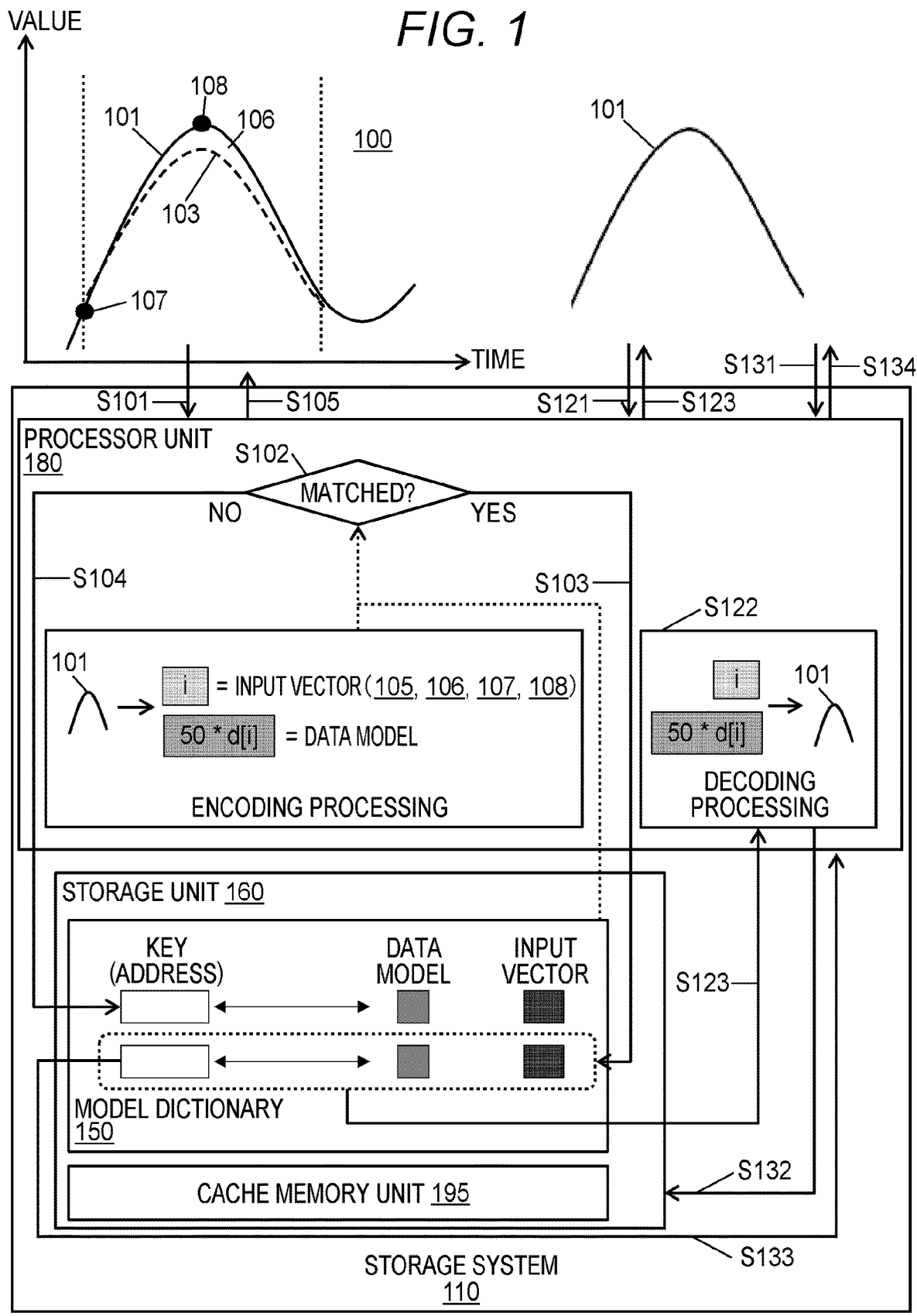
FIG. 1 is a schematic diagram of a storage system according to a first embodiment.

In the following description, an "interface unit" may be one or more interfaces. One or more interfaces may include at least a communication interface unit in a user interface unit and the communication interface unit. The user interface unit may be at least one I/O device in one or more I/O devices (for example, an input device (for example, a keyboard and a pointing device) and an output device (for example, a display device)) and computers for display or may be an interface device for at least one I/O device, instead of or in addition to at least one I/O device. The communication interface unit may be one or more communication interface devices. One or more communication interface devices may be the same type of one or more communication interface devices (for example, one or more network interface cards (NICs)) or may be different types of two or more communication interface devices (for example, the NIC and a host bus adapter (HBA)).

In the following description, a "memory unit" may be one or more memories. At least one memory may be a volatile memory or may be a non-volatile memory. The memory unit is mainly used for processing by a processor unit.

In addition, in the following description, a "PDEV unit" may be one or more PDEVs. The "PDEV" means a physical storage device and is typically a non-volatile storage device (for example, an auxiliary storage device), for example, a hard disk drive (HDD) or a solid state drive (SSD). The PDEV unit may be a RAID group. A "RAID" is an abbreviation for a redundant array of independent (or inexpensive) disks.

In addition, in the following description, a "storage unit" includes at least one (typically, at least the memory unit) of the memory unit and the PDEV unit.

In addition, the following description, the "processor unit" may be one or more processors. At least one processor is typically a microprocessor such as a central processing unit (CPU), but it may be another type of processor such as a graphics processing unit (GPU). Each of one or more processors may be a single core or may be a multicore. A part of the processors may be a hardware circuit that performs a part or all of processing.

In addition, in the following description, the function may be described by expressing a "kkk layer". However, the function may be realized by executing one or more computer programs by the processor unit or may be realized by one or more hardware circuits (for example, a field-programmable gate array (FPGA), an application specific integrated circuit (ASIC), a neuromorphic device, or a quantum device). In the case where the function is realized by executing the program by the processor unit, because determined processing is performed appropriately using the storage unit and/or the interface unit, the function may be at least a part of the processor unit. The processing described with the function as the subject may be processing performed by the processor unit or a device having the processor unit. The program may be installed from a program source. The program source may be, for example, a program distribution computer or a computer-readable recording medium (for example, a non-transitory recording medium). The description of each function is an example and a plurality of functions may be combined into one function or one function may be divided into a plurality of functions.

In addition, in the following description, information may be described by an expression such as an "xxx table", but the information may be expressed by any data structure. That is, to show that the information does not depend on the data structure, the "xxx table" can be called "xxx information". In addition, in the following description, a configuration of each table is an example and one table may be divided into two or more tables or a part or all of two or more tables may be one table.

In addition, in the following description, when the same type of elements are described distinctively, reference numerals of the elements may be used (for example, nodes 201A and 201B) and when the same kind of elements are described non-distinctively, a common portion of reference numerals of the elements may be used (for example, a node 201).

In addition, in the following description, the "storage system" includes one or more physical storage devices. The "physical storage device" may be any device having a storage unit. Therefore, the "physical storage device" may be, for example, a physical general-purpose computer. At least one physical storage device may execute a virtual computer (for example, a virtual machine (VM)) or may execute software-defined anything (SDx). As the SDx, for example, a software defined storage (SDS) (an example of a virtual storage device) or a software-defined datacenter (SDDC) can be adopted.

In addition, in the following description, a "data set" is a logical electronic data block viewed from a program such as an application program, for example, a record, a file, a key value pair, or a tuple.

Hereinafter, several embodiments are described with reference to the drawings. In the following description, a data set group includes a plurality of data sets. However, the present invention may be applied even if the number of data sets forming the data set group is one.

First Embodiment

FIG. 1 is a schematic diagram of a storage system according to a first embodiment.

A storage system 110 according to this embodiment converts a data set group to be written to be a plurality of data sets to be written into a data model showing regularity of the data set group to be written and having one or more input values as an input and the data set group as an output, associates the data model with a key of the data set group to be written, and makes a dictionary. Making the data model into the dictionary corresponds to writing of the data set group.

Typically, the data model is a binary string expressing regularity such as mathematical expression processing, a waveform shape, and a probability distribution. An increase amount in the data amount of the data model (and an input vector to be described later) is smaller than an increase amount in the data amount of the data set group to be written. Therefore, it is expected that an effect of reducing the data amount is higher when the data amount of the data set group to be written is larger.

Different from data such as one or more input values, the data model corresponds to an execution subject that processes input data. As the data model, for example, a model such as a neural network can be adopted. Generally, the model such as the neural network is used for analysis such as failure rate calculation or image recognition. In this embodiment, the model is adopted as an example of a data model showing the regularity of the data set group and the storage system 110 is a new storage system for replacing one or more data models (execution subject) by one or more data set groups and holding the data set groups.

An outline of the storage system 110 is described in more detail with reference to FIG. 1. The data model does not necessarily require the input vector to be described later, depending on a type of the model adopted as the data model (for example, when there is one unit of an input layer and determined integer values 0 to N are used as input values, it is not necessary to store the integer values).

The storage system 110 has a storage unit 160 and a processor unit 180 connected to the storage unit 160. The storage unit 160 includes a cache memory unit 195 to be one or more cache memories. A cache memory is a memory area provided in at least one memory and is a memory area in which data to be an input/output (I/O) target is temporarily stored.

The storage unit 160 stores a model dictionary 150. The model dictionary 150 is a dictionary of a data model and stores a data model and an input vector for each key. The key includes, for example, an address of a write destination (for example, an ID of a logical volume of the write destination and an address (for example, a logical block address (LBA)) of an area in the logical volume).

In the storage system 110, each portion of time series data 100 (for example, an array including digitized information such as time series data of a value measured by a sensor) becomes a data set group to be written. Hereinafter, in the description of FIG. 1, one data set group 101 is mainly taken as an example. The data set group 101 is a plurality of data sets belonging to a predetermined data set range (here, a time range). The "data set" mentioned here includes a time (measurement time) and a value (measurement value). When the data set range is x seconds and y data sets form the data set group 101, y/x is an input frequency. For example, in the case of x=10 and y=1000, the input frequency is 100 (1000/10) Hz.

Hereinafter, outlines of write processing, read processing, and search processing of the data set group 101 are described.

<Write Processing of Data Set Group 101>

The processor unit 180 receives a write request of the data set group 101 (S101). The write request is associated with the address of the write destination. The data set group 101 to be written is stored in the cache memory unit 195.

When the processor unit 180 receives the write request, the processor unit 180 searches a matching data model to be a data model having a highest matching degree with the data set group 101 from the model dictionary 150 and performs matching determination by comparing the matching degree with the matching data model and a first threshold value (S102).

The matching degree is an index representing a similarity of two target data models, two target data set groups, or hash values (rolling hash or fuzzy hash) generated therefrom. Examples of the index (examples of indexes for a plurality of values) include a cosine similarity. In addition, generally known methods such as mean square error and cross entropy may be used.

For example, the following methods (C1) and (C2) are considered as specific methods of comparing matching degrees. The matching determination (and similarity determination to be described later) may include any one of the following comparisons (C1) and (C2). However, in this embodiment, the comparison of (C1) is adopted.

(C1) Data model comparison For example, the processor unit 180 performs encoding processing including processing for generating a data model of the data set group 101 and processing for generating an input vector based on the data set group 101. The processor unit 180 calculates a matching degree of the generated data model (or a hash value thereof) and each data model (or a hash value thereof) in the model dictionary 150.

(C2) Data set group comparison For example, for each data model in the model dictionary 150, the processor unit 180 restores the data set group using the input vector associated with the data model. The processor unit 180 calculates a matching degree of the data set group 101 and each restored data set group. Instead of performing comparison with the restored data set group in the same way as (C1), comparison may be performed with a previously calculated hash value (a part or all of a data set group of an encoding source). As a hash method, a method described in ( ) below such as fuzzy hash and rolling hash may be used.

Specifically, the search processing of the model dictionary 150 may be performed at a high speed by using a generally known technique (a hash table or the like). In addition, similar models may be recalled using a Hopfield network or the like.

In comparison processing in the matching determination, when a matching degree is the first threshold value or more for the matching data model, matching is determined.

When a determination result in S102 is false (S102: N), the processor unit 180 adds a new data model and a new input vector generated in the encoding processing and associated with the key of the data set group 101 to the model dictionary 150 (S103).

When the determination result in S102 is true (S102: Y), the processor unit 180 updates the key and the input vector associated with the matching data model (for example, adds an address of the write destination to the key) (S104). The input vector includes difference information between the matching data model and the data set. However, it is considered that it is not necessary to store the input vector, when there is no difference at all. This avoids at least writing of duplicate data models and further avoids writing of input vectors in some cases. As a result, further reduction of a data amount can be expected. The matching determination in S102 may be performed asynchronously with the write processing. That is, the processor unit 180 may temporarily store the data model and the input vector of the data set group 101 to be written in the model dictionary 150 and may regularly (or irregularly) determine whether or not there are duplicate data models and input vectors in the model dictionary 150. When the determination result is true, the processor unit 180 may delete the duplicated data model and input vectors from the model dictionary 150.

The processor unit 180 returns a completion response of the write request (S105). The completion response may be returned when S103 or S104 is performed or may be returned when the data set group 101 is stored in the cache memory unit 195.

The data model may be based on a normalized maximum value (for example, "1") and a normalized minimum value (for example, "0") to be values obtained by normalizing a maximum value 108 and a minimum value 107 in the data set group 101. This increases the probability of finding a matching data model (or a similar data model to be described later).

In addition, the input vector includes the following (a) to (d).

(a) Maximum value 108 (maximum value before normalization) in the data set group 101,
(b) minimum value 107 (minimum value before normalization) in the data set group 101,
(c) input value 105 for the data model, and
(d) difference information 106 showing a difference between the data set group 101 and a pattern 103. When a neural network in which an input value is static (for example, a value of an x axis (time axis in FIG. 1) in the data 100 is input) is used as the data model, it is unnecessary to remember the value of the x axis, so that at least the input value 105 in the input vector can be omitted. When a generation model such as an autoencoder is used as the data model, the input value 105 may be a feature amount vector or the like. The pattern 103 is a data set group output from the data model by inputting the input value 105 to the data model. Although the information of (a) and (b) is not necessary, the reduction of the information amount of (d) can be expected by (a) and (b).

The input value 105 in the input vector is input to the data model and the difference information 106 (and the minimum value 107 and the maximum value 108) in the input vector is reflected in the pattern 103 (data set group) output from the data model, so that it is possible to restore the data set group 101 having no error. (d) (the difference information 106) is compressed and the input vector may include (a) to (c) and compressed (d). As a result, it can be expected that the data amount of the input vector is reduced. The compression of (d) may be compression according to existing compression methods. Also, the compression may be software processing or hardware processing.

<Read Processing of Data Set Group 101>

The processor unit 180 receives a read request of the data set group 101 (S121). The read request is associated with an address of a read source.

The processor unit 180 specifies the data model and the input vector corresponding to the key including the address of the read source from the model dictionary 150. The processor unit 180 performs decoding processing including processing for restoring the data set group by inputting the specified input vector to the specified data model (S122). In the first embodiment, conversion between the data set group and the data model and the input vector is reversible conversion. Therefore, the restored data set group is the data set group 101. The processor unit 180 returns the restored data set group 101 (S123).

<Search Processing of Data Set Group 101>

The processor unit 180 receives a search request (S131). A search condition is associated with the search request. As the search condition, various conditions can be adopted. For example, the search condition is the data set group 101 to be searched or the data model of the data set group 101.

The processor unit 180 searches a target data model to be a data model conforming to the search condition from the model dictionary 150 (S132). For example, when the search condition is the data set group 101, the processor unit 180 generates a data model of the search condition (data set group 101) by performing the encoding processing and searches a target data model conforming to the data model (for example, a matching degree is smaller than the first threshold value). For example, when the search condition is the data model of the data set group 101, the processor unit 180 searches a target data model conforming to the data model (for example, a matching degree is smaller than the first threshold value).

When the target data model is found, the processor unit 180 acquires a key associated with the found target data model from the model dictionary 150 (S133) and returns the acquired key (S134).

That is, according to the search processing, the processor unit 180 returns the key associated with the target data model, instead of restoring the data set group from the target data model and returning the data set group. This makes it unnecessary to transfer the data set group to the search request source. In addition, in the search processing, the restoration of the data set group and the comparison of the data set group are not performed and the comparison of the data model is performed. Therefore, a load of the search processing is small, so that it can be expected that a speed of the search processing is increased. In addition, a model hash table 402 to be described later may be used for the search processing.

The above is the outline of the write processing, the read processing, and the search processing of the data set group 101.

If there is a similar data model to be a data model in which a matching degree with the data model of the data set group 101 is less than the first threshold value and equal to or more than a second threshold value (first threshold value>second threshold value), the processor unit 180 may generate a data model including a model ID of the similar data model and difference data between the similar data model and the data model of the data set group 101, as the data model of the data set group 101. As a result, it can be expected that the data amount of the data model is reduced, so that it can be expected that a size of the model dictionary 150 is reduced.

In addition, when the storage system 110 includes a plurality of nodes (an example of a physical storage device), the plurality of nodes may share the model dictionary 150. This makes it possible to expect more efficient data storage.

Hereinafter, the first embodiment is described in detail.

Figure 2:
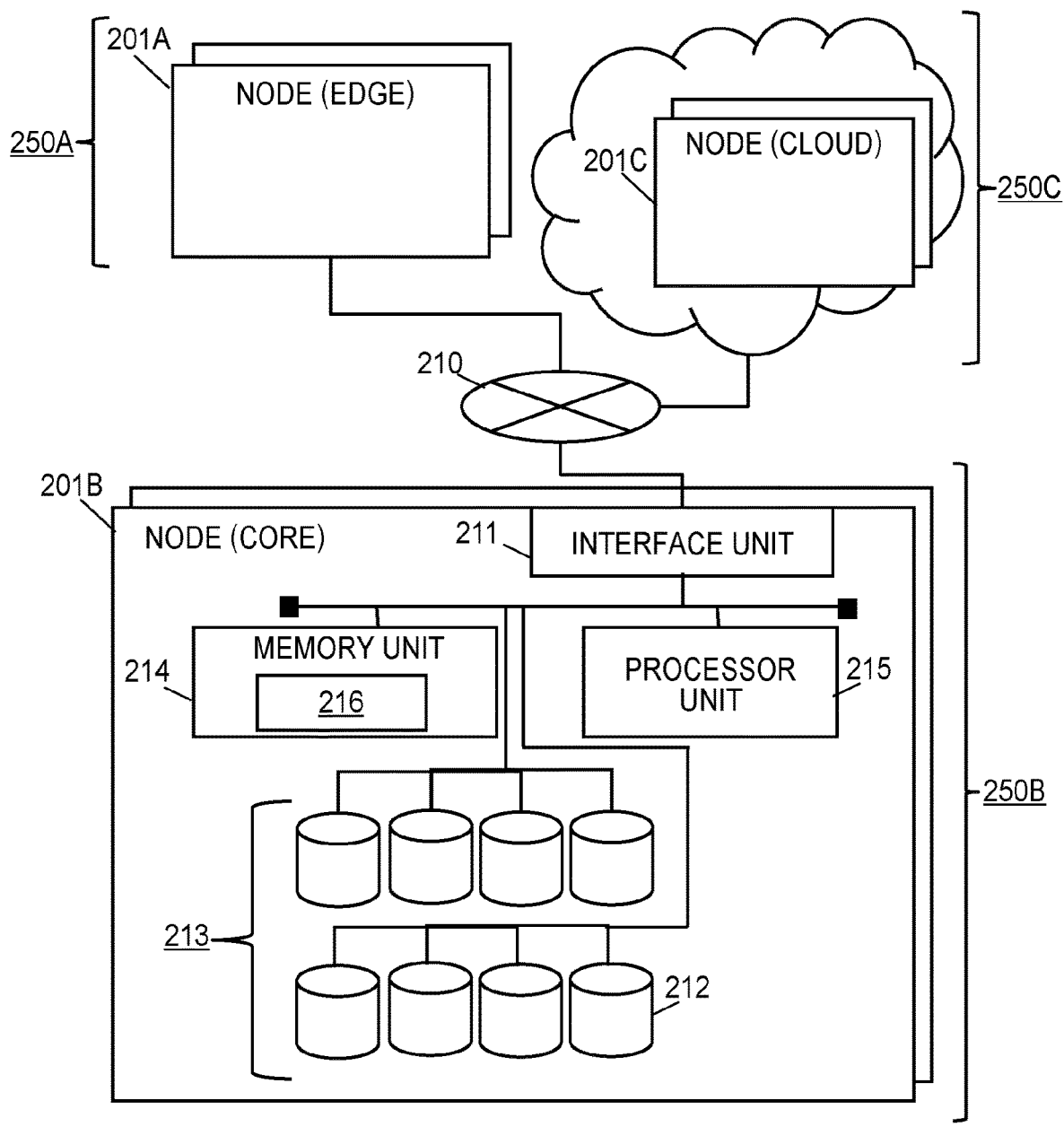
FIG. 2 shows an example of a system configuration.

FIG. 2 shows an example of a system configuration.

There is one or more node units 250 connected to a communication network 210 (for example, a local area network (LAN), a wide area network (WAN), or the Internet). The node unit 250 is one or more nodes 201. The storage system 110 is at least one node unit 250.

As the node unit 250, there are an edge node unit 250A, a core node unit 250B, and a cloud node unit 250C. The edge node unit 250A is one or more nodes (hereinafter, referred to as edge nodes) 201A communicating with one or more hosts (not shown in the drawings). The core node unit 250B is one or more nodes (hereinafter, referred to as core nodes) 201B communicating with the edge node unit 250A. The cloud node unit 250C corresponds to a so-called cloud infrastructure and is one or more nodes (hereinafter, referred to as cloud nodes) 201C communicating with one or more hosts (not shown in the drawings) or one or more node units 250.

For example, the core node 201B has an interface unit 211, a PDEV unit 213, a memory unit 214, and a processor unit 215 connected to these elements. The memory unit 214 includes a cache memory unit 216. The PDEV unit 213 includes one or more PDEVs 212.

The memory unit 214 and the PDEV unit 213 of one or more nodes 201 are the storage unit 160 of FIG. 1. The cache memory unit 216 of one or more nodes 201 is the cache memory unit 195 of FIG. 1. The processor unit 215 of one or more nodes 201 is the processor unit 180 of FIG. 1. In this embodiment, one or more nodes 201 are the storage system 110 of FIG. 1.

Figure 3:
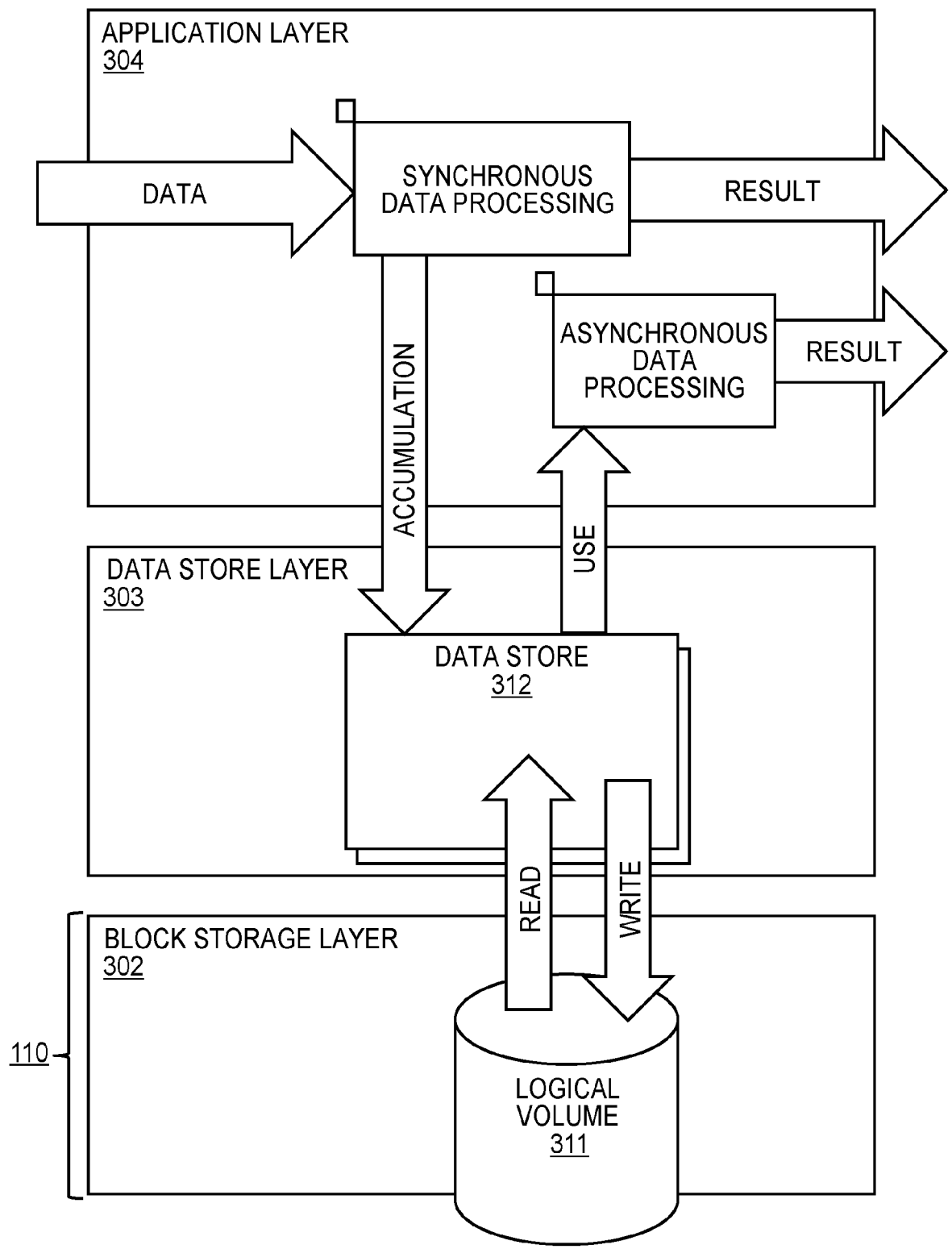
FIG. 3 shows a logical hierarchical structure of a system.

FIG. 3 shows a logical hierarchical structure of a system.

A system (the storage system 110 or a system including the storage system 110) provides a block storage layer 302, a data store layer 303, and an application layer 304. The storage system 110 provides at least the block storage layer 302. These layers 302 to 304 are provided by one or more nodes 201. That is, these layers 302 to 304 may be provided by the same node 201 or may be provided by two or more different nodes 201 (for example, the layers 304 and 303 may be provided by the first node 201 and the layer 302 may be provided by the second node 201). Each of the layers 302 to 304 may be a function provided by executing one or more computer programs by the processor unit 180 (one or more processor units 215). For example, the block storage layer 302, the data store layer 303, and the application layer 304 may be replaced with a block storage program, a data store program, and an application program, respectively.

The block storage layer 302 provides one or more logical volumes 311. Each logical volume 311 is a logical storage area. Each logical volume 311 may be a substantive logical volume (for example, a logical volume based on one or more PDEVs 212). However, in this embodiment, each logical volume 311 includes a virtual logical volume, specifically, a plurality of virtual pages (virtual storage areas) and is a logical volume that follows capacity virtualization technology (typically, thin provisioning). One or more pools are managed by the block storage layer 302. Each pool is a storage area that includes a plurality of physical pages (substantive storage areas) based on one or more PDEVs 212.

The data store layer 303 manages one or more data stores 312. Each data store 312 is a logical data storage area having the same attribute (for example, a data source and a type). One or more data sets stored in the data store 312 may be, for example, structured data such as a database (for example, a column store database) or non-structured data such as a file or a directory. The data set in the data store 312 is written to the logical volume 311 or is read from the logical volume 311.

The application layer 304 performs synchronous data processing (for example, stream data processing) and asynchronous data processing. The synchronous data processing is processing for accumulating the input time series data 100 in the data store 312 in a unit of a data set group, performing processing (for example, analysis processing) of one or more data set groups, or outputting a result of the processing. The asynchronous data processing is processing for reading one or more data sets from the data store 312, performing processing (for example, analysis processing) of one or more data sets, or outputting a result of the processing.

At least one node 201 (for example, the core node 201B) provides the block storage layer 302. In this embodiment, the block storage layer 302 executes encoding processing and decoding processing (for example, processing shown in FIGS. 10 to 14, including those processing). For this reason, it is preferable that conversion between the data set group and the data model and the input vector is reversible conversion. Therefore, in this embodiment, the reversible conversion is adopted as described above. Hereinafter, one node 201 providing the block storage layer 302 is taken as an example.

Figure 4:
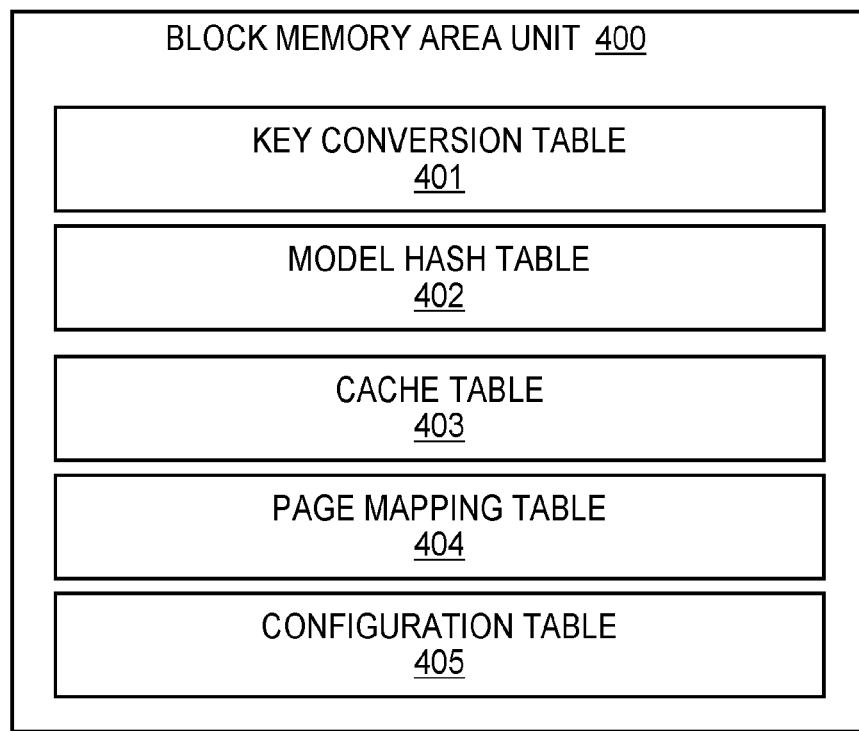
FIG. 4 shows a table stored in a block memory area unit.

FIG. 4 shows a table stored in a block memory area unit.

A block memory area unit 400 is a memory area unit managed by the block storage layer 302. The "memory area unit" is one or more memory areas in the memory unit 214. The block memory area unit 400 stores a key conversion table 401, a model hash table 402, a cache table 403, a page mapping table 404, and a configuration table 405. At least a part of these tables 401 to 405 may be stored in the PDEV unit 213 for the purpose of non-volatilization, memory efficiency improvement, or the like.

Figure 5:
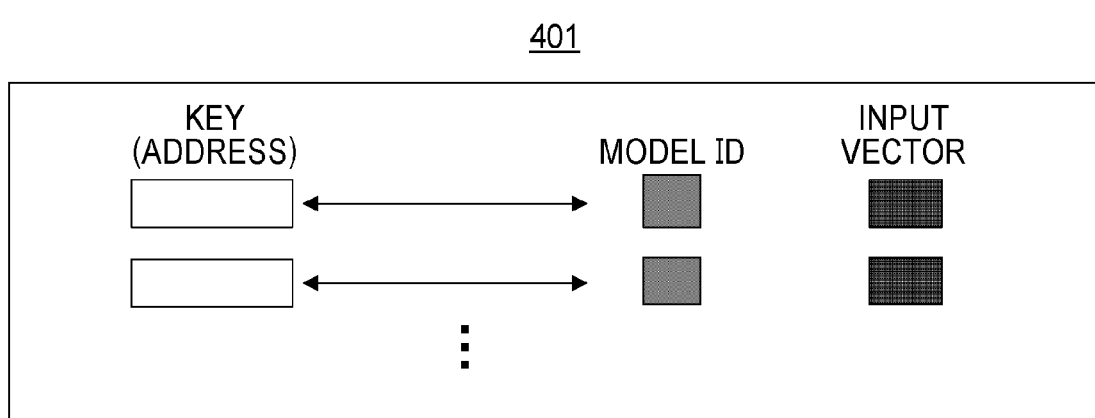
FIG. 5 shows a configuration of a key conversion table.

FIG. 5 shows a configuration of the key conversion table 401.

The key conversion table 401 is a table for conversion between the key and the data model and the input vector. For example, the key conversion table 401 has a record for each key. Each record stores information such as the key, the model ID, and the input vector.

The key includes an address (for example, a physical address (an address belonging to a physical page)). The address may be defined by, for example, a start address and an address range (data length). The address range may be fixed or variable. The physical address in the key is associated with a logical address (an address belonging to a virtual page) through the page mapping table 404. Therefore, it is possible to specify a corresponding logical address from the physical address in the key. When the capacity virtualization technology (typically, thin provisioning) is not adopted, the key may include a logical address (for example, an address specified by a write request or a read request).

The model ID is an ID of the data model. For example, the model ID may be incrementally added (for example, it may be a serial number). A PDEV position may be uniquely calculated from the model ID.

The input vector is based on the corresponding data set group.

As described above, the data model is a binary string expressing regularity such as mathematical expression processing, a waveform shape, and a probability distribution. The data model receives an input vector and outputs a data set group. For example, a general neural network, a generation model (for example, gaussian mixture models (GMM), hidden markov model (HMM), stochastic context-free grammar (SCFG), generative adversarial nets (GAN), or variational auto encoder (VAE)), genetic programming, or the like may be used in the data model. In addition, model compression such as Mimic Model may be applied to reduce an information amount of the data model. The data input to the storage may include information other than numerical values (for example, a device ID or the like), so that type information generally used in programming may be given. For compression between data models, a model ID of another data model may be included in the data model for reference. Because the data model is stored in the PDEV unit 213, at least a part of the data model may be stored in the cache memory unit 216 only during the encoding processing or the decoding processing. In one or more encoding processing, the encoding processing of the data model may be recursively applied in multiple stages.

When the data model is generated, as described above, a normalized minimum value (for example, "0") and a normalized maximum value (for example, "1") to be normalized values of the minimum value and the maximum value in the original data set group may be used (that is, a value range of an output may be corrected to 0 to 1). As described above, the minimum value and the maximum value before normalization (and a data set range of the data set group) may be included in the input vector. In addition, the input vector may include difference information showing a difference between the data set group and the pattern. The "pattern" is a data set group output from the data model by inputting an input value to the data model, as described above.

In addition, the difference information in the input vector may be compressed by the block storage layer 302. As a result, it is possible to reduce the data amount of the input vector. In the decoding processing, the difference information is used after decompression.

Figure 6:
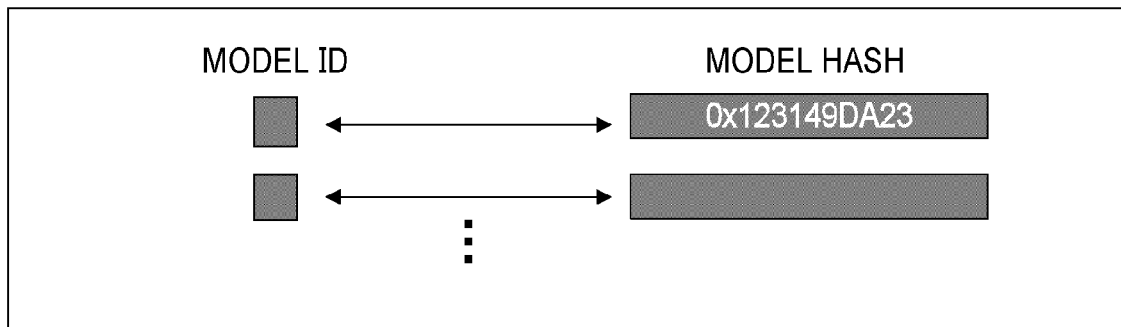
FIG. 6 shows a configuration of a model hash table.

FIG. 6 shows a configuration of the model hash table 402.

The model hash table 402 stores a hash value of the data model. Specifically, for example, the model hash table 402 has a record for each data model. Each record stores information such as a model ID and a model hash (hash value of the data model).

The matching determination described above may be performed by comparing the model hash of the data model of the data set group to be written with each model hash in the model hash table 402. As a result, it is unnecessary to access the PDEV 212 for reading the data model and high-speed matching determination can be expected.

For the model hash, a hash value calculated from data for detecting the similarity of the data model, fuzzy hashing, a rolling hash, or the like may be applied. In addition, the model hash may be an example of a feature value (feature amount) of the data model and the feature value may be a feature value other than the hash value (for example, it may be a value obtained by inputting the data model to a one-way function or a value obtained by using pattern detection associated technology (Hopfield network or the like)).

Figure 7:
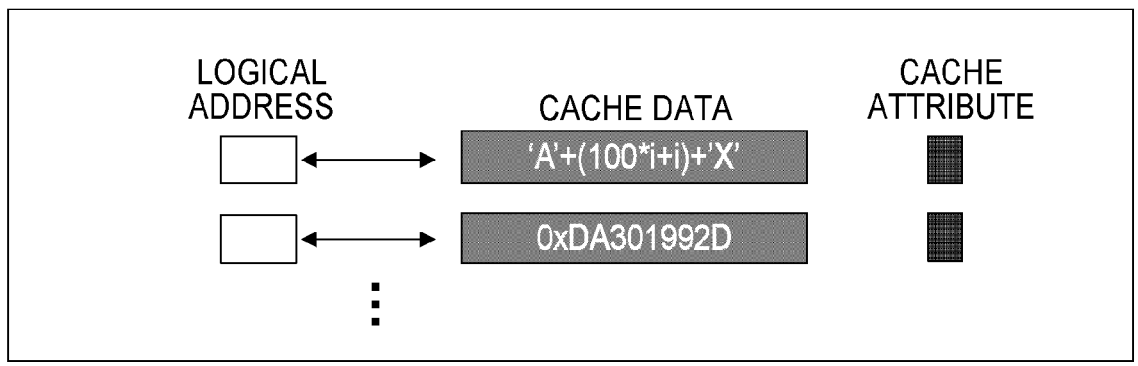
FIG. 7 shows a configuration of a cache table.

FIG. 7 shows a configuration of the cache table 403.

The cache table 403 stores information on a state of each cache area in the cache memory unit 216. The "cache area" is a partial area of the cache memory unit 216. A size of the cache area may be fixed or variable.

For example, the cache table 403 has a record for each cache area. Each record stores information such as a logical address, cache data, and a cache attribute.

The logical address shows the logical address (address belonging to the virtual page) associated with the cache area.

The cache data is a data model or one or more data sets. Because both the data model and the data set exist in the cache memory unit 216, the cache data may not be stored in the table 403. In addition, a set of a data model and an input vector may be written to the PDEV unit 213.

The cache attribute shows an attribute of the cache area. For example, the cache attribute is any one of "clean" (the data (data model or one or more data sets) in the cache area has been written to the PDEV unit 213), "dirty" (the data in the cache area is not written to the PDEV unit 213), "decoded" (one or more data sets exist in the cache area), and "not decoded" (the data model exists in the cache area). The cache attribute such as "clean" and "dirty" and the cache attribute such as "decoded" and "not decoded" may be independent. At a point of time when the synchronous write processing is completed, the cache attribute is "dirty" and "decoded" (an original state not to be modeled). However, at a point of time when the asynchronous write processing is completed, the cache attribute is "clean" and "not decoded". Whether the cache attribute is "dirty" or "clean" can follow the transition of a cache state of a generally known storage system. The transition and "decoded" or "not decoded" may be independent. For example, the cache attribute may be controlled to "decoded" or "not decoded", from a relation between a cache hit ratio and an access characteristic and data store efficiency in the cache memory.

Figure 8:
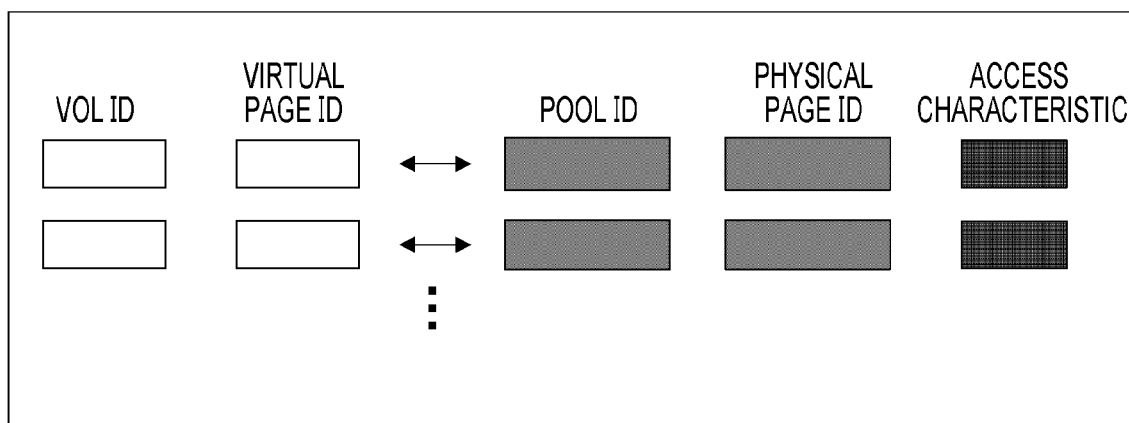
FIG. 8 shows a configuration of a page mapping table.

FIG. 8 shows a configuration of the page mapping table 404.

The page mapping table 404 shows a relation between a virtual page and a physical page and an access characteristic of the physical page. For example, the page mapping table 404 has a record for each virtual page. Each record stores information such as a VOL ID, a virtual page ID, a pool ID, a physical page ID, and an access characteristic.

The VOL ID is an ID of a logical volume including the virtual page. The virtual page ID is an ID (for example, an address) of the virtual page. A pool ID is an ID of a pool including the physical page allocated to the virtual page. The physical page ID is an ID of the physical page (a storage area in the pool) allocated to the virtual page. The access characteristic shows an access characteristic (for example, an I/O load) of the physical page. At least one of an "I/O number" and an "I/O size" can be adopted as the "I/O load". The "I/O number" is the number of I/O (for example, I/O requests) issued per unit time. The "I/O size" is a total size of target data of I/O issued per unit time. In this embodiment, the "I/O number" is adopted as the "I/O load". The page mapping table 404 is used for a kind of control such as not performing the encoding processing when the write destination is a physical page of a high I/O load. Instead of the I/O load, a load of the processor unit 215 may be adopted. For example, if the load of the processor unit 215 is a high load (for example, a certain threshold value or more), the processor unit 215 may not perform the encoding processing. In other words, if the load of the processor unit 215 is a low load (for example, less than the certain threshold value), the processor unit 215 may perform the encoding processing.

Figure 9:
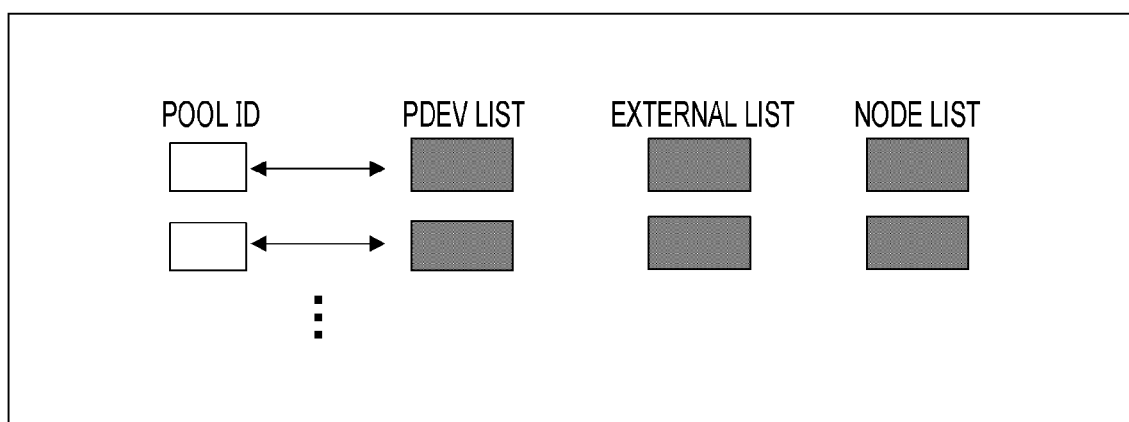
FIG. 9 shows a configuration of a configuration table.

FIG. 9 shows a configuration of the configuration table 405.

The configuration table 405 stores information on a configuration of the pool. For example, the configuration table 405 has a record for each pool. Each record stores information such as a pool ID, a PDEV list, an external list, and a node list.

The pool ID is an ID of the pool. The PDEV list is a list of IDs of PDEVs 212 to be the base of the pool. The external list is a list of IDs of external devices to be the base of the pool. The "external device" mentioned here is a device (for example, the logical volume or the PDEV) provided by the node 201 other than the node 201 that provides the pool. The node list is a list of IDs of nodes that provide the external devices.

That is, the pool may be based on a device outside the node 201, instead of or in addition to the PDEV 212 in the node 201 providing the pool.

Hereinafter, processing performed by the block storage layer 302 is described with reference to FIGS. 10 to 14.

Figure 10:
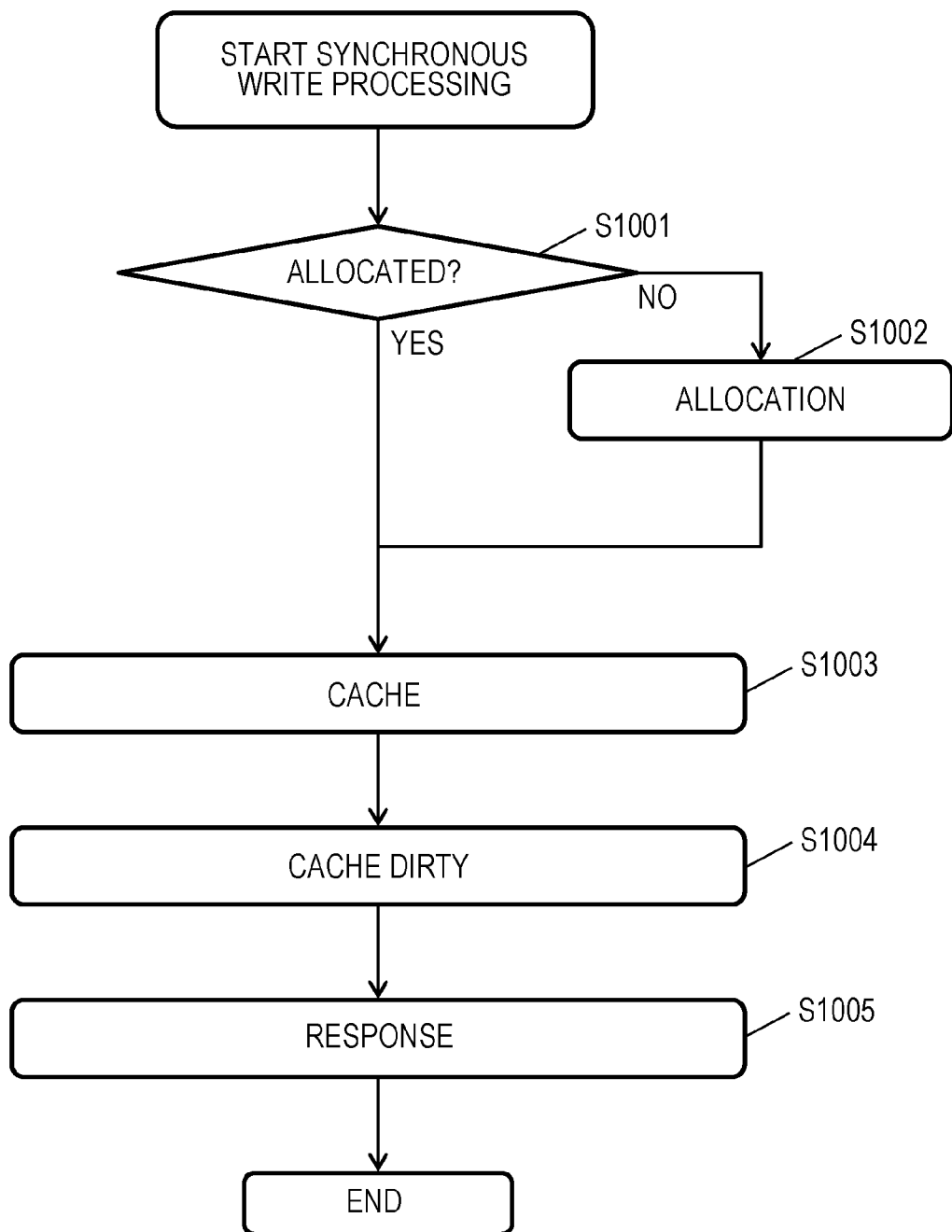
FIG. 10 shows a flow of synchronous write processing.

FIG. 10 shows a flow of synchronous write processing.

The synchronous write processing is a part of the write processing and starts when a write request is received. In the following description, a write target in the synchronous write processing is a data set group. However, instead of the data set group, other data such as a data model may be the write target.

That is, the block storage layer 302 determines whether or not a physical page is allocated to a write destination virtual page (virtual page to which the address specified by the write request belongs), on the basis of the page mapping table 404 (S1001). When a determination result in S1001 is false (S1001: N), the block storage layer 302 allocates an empty physical page (physical page not allocated to any virtual page) to the write destination virtual page (S1002).

When the determination result in S1001 is true (S1001: Y) or after S1002, the block storage layer 302 secures a cache area from the cache memory unit 216 and stores a data set group to be written (a data set group attached to the write request) in the secured cache area (S1003). The block storage layer 302 sets the cache attribute of the cache area to "dirty" (S1004). Then, the block storage layer 302 returns a response to the write request (S1005).

Figure 11:
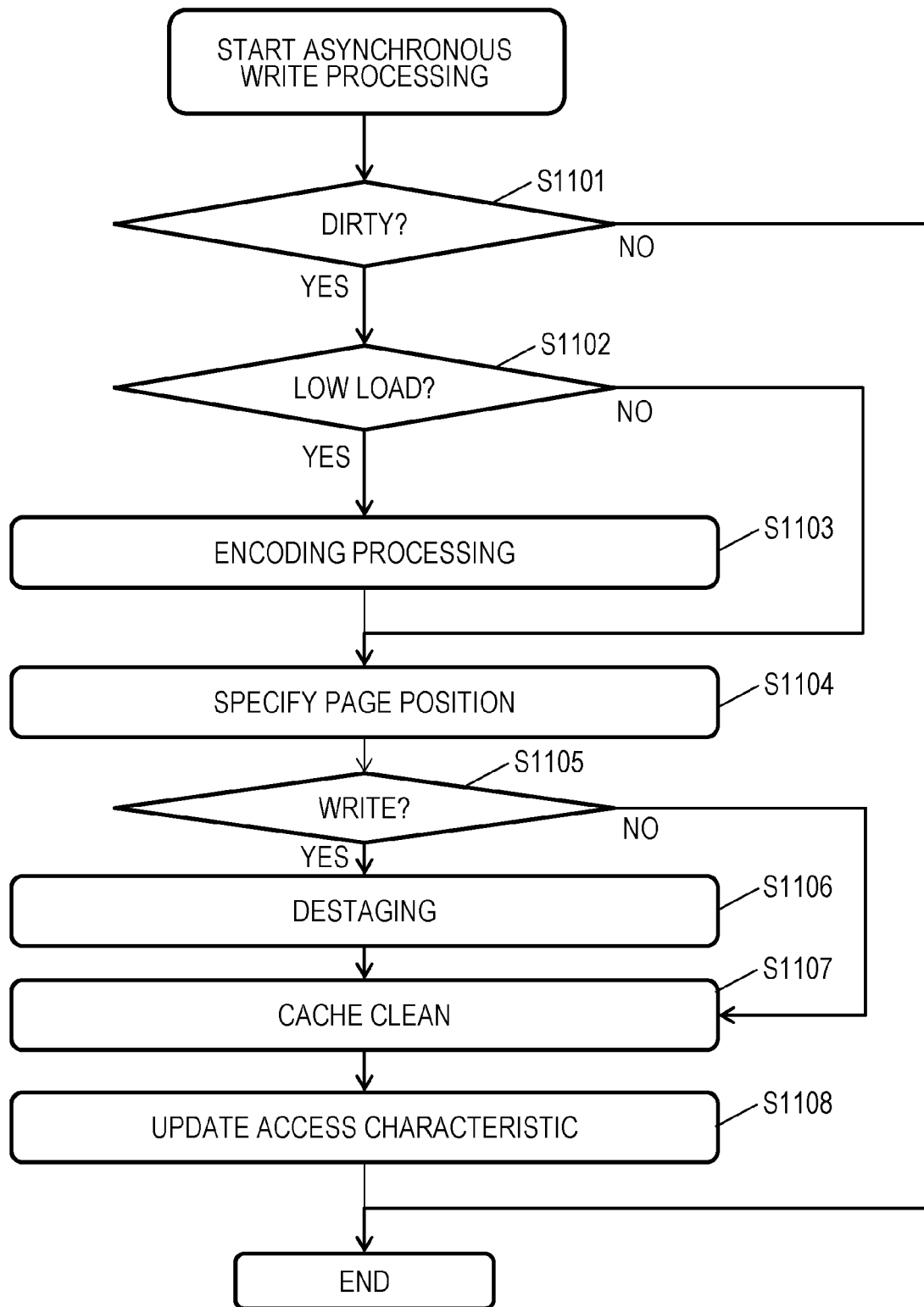
FIG. 11 shows a flow of asynchronous write processing.

FIG. 11 shows a flow of asynchronous write processing.

The asynchronous write processing is a part of the rest of the write processing and is processing performed asynchronously with reception of the write request. In the following description, a cache area corresponding to "dirty" is referred to as a "dirty area".

The block storage layer 302 refers to the cache table 403 and determines whether or not there is the dirty area (S1101). When a determination result in S1101 is false (S1101: N), the processing ends.

When the determination result in S1101 is true (S1101: Y), the block storage layer 302 specifies a virtual page corresponding to the dirty area, on the basis of the cache table 403, specifies an I/O load (access characteristic) corresponding to the specified virtual page, on the basis of the page mapping table 404, and determines whether or not the specified I/O load is a low load (whether or not it is less than a predetermined value) (S1102). As an example of the "dirty area" mentioned here, any dirty area in which the data set group is stored is used hereinafter.

When a determination result in S1102 is true (S1102: Y), the block storage layer 302 performs encoding processing (S1103) on the data set group in the dirty area. When the determination result in S1102 is false (S1102: N), the encoding processing (S1103) is skipped. As a result, it can be expected that I/O performance is avoided from being degraded, by performing the encoding processing even for the data set group where the physical page of the high I/O load is the write destination.

After the encoding processing (S1103) or when the determination result in S1102 is false (S1102: N), the block storage layer 302 specifies a page position (position in the physical page) of the write destination (S1104). The block storage layer 302 determines whether or not there is the write target (S1105). When a matching data model is not found in the encoding processing or when the encoding processing is skipped, a determination result in S1105 is true.

When the determination result in S1105 is true (S1105: Y), the block storage layer 302 performs destaging (S1106). That is, the block storage layer 302 writes the write target (data model or data set group) to the page position specified in S1104, on the basis of the configuration table 405.

When the determination result in S1105 is false (S1105: N) or after S1106, the block storage layer 302 updates the attribute of the dirty area with "clean". In addition, the block storage layer 302 updates the access characteristic (I/O load) corresponding to the physical page having the page position specified in S1104 (S1108).

Figure 12:
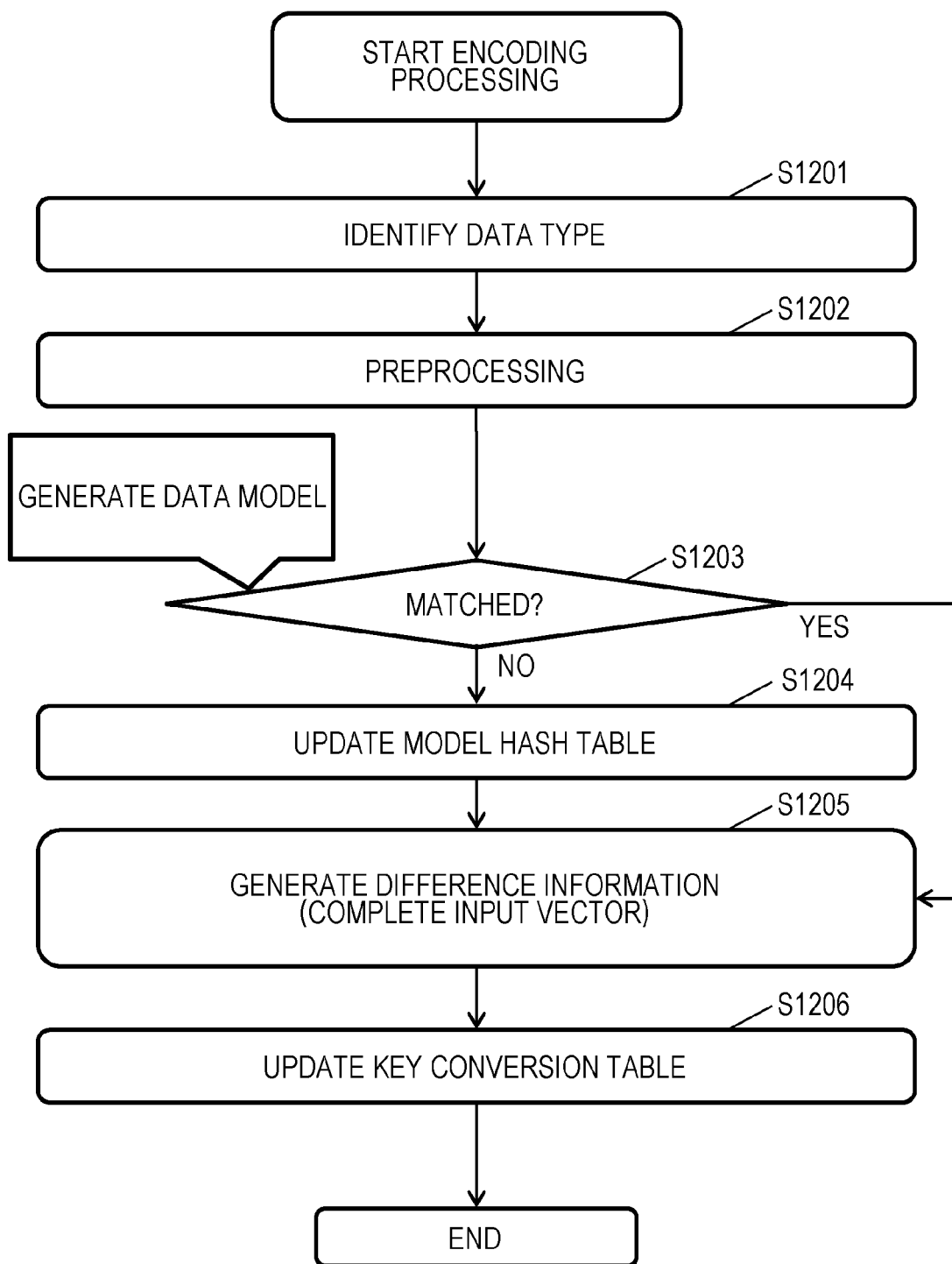
FIG. 12 shows a flow of encoding processing.

FIG. 12 shows a flow of the encoding processing.

The block storage layer 302 identifies a type (for example, a type such as a moving image, a still image, and CSV data) of the data set group in the dirty area (S1201). In addition, the block storage layer 302 performs preprocessing (for example, column division or frame division for each data type) (S1202).

The block storage layer 302 performs matching determination on whether or not there is a matching data model to be a data model in which a matching degree with the data model of the data set group in the dirty area is the first threshold value or more (S1203). In this embodiment, in the matching determination, the comparison of (C1) is adopted as described above. That is, the block storage layer 302 generates a data model of the data set group in the dirty area and calculates a model hash of the data model. For example, when the neural network is adopted, generation of the data model corresponds to execution of learning processing thereof. In this case, generally known learning processing such as back propagation or a numerical differentiation method is executed. The number of times of repetition of a learning cycle may be terminated at appropriate timing from the progress of learning and the expected data reduction effect. In addition, a learning speed may be increased by using techniques such as meta learning and transfer learning. In addition, the block storage layer 302 determines whether or not a model hash in which a matching degree with the calculated model hash is the first threshold value or more exists in the model hash table 402. When there are two or more data models in which a matching degree is the first threshold value or more, a data model having a highest matching degree may be the "matching data model".

If a determination result in S1203 is true (S1203: Y), the block storage layer 302 generates difference information to be a difference between the data set group in the dirty area and the pattern (data set group output from the matching data model), completes a new input vector (S1205), and updates the key conversion table 401 (S1206). Specifically, for example, the block storage layer 302 newly associates a new key including the address of the write destination and a new input vector (input vector including the difference information) generated in S1205 with a model ID of the matching data model.

When the determination result in S1203 is false (S1203: N), the block storage layer 302 updates the model hash table 402 (S1204). For example, the block storage layer 302 adds the calculated model hash and the model ID of the generated data model to the model hash table 402. In S1204, the block storage layer 302 may perform similarity determination, that is, may determine whether or not there is a similar data model to be a data model in which a matching degree with the generated data model is less than the first threshold value and equal to or more than the second threshold value (first threshold value>second threshold value). If a result of the similarity determination is true, the block storage layer 302 may set the difference data model including the model ID of the similar data model and the difference data between the similar data model and the generated data model as the data model of the data set group in the dirty area. As a result, it can be expected that the data amount of the data model is reduced. In addition, in a method of generating the difference data model, a data model to be stacked on the similar data model may be generated and a data model including the data model and a model ID of the similar data model may be adopted as the difference data model. Specifically, for example, the block storage layer 302 may generate a data model to be stacked by learning processing of the neural network portion connected thereto without changing the similar data model as the base. In addition, a method such as generally known transition learning may be applied. A new model portion generated by this processing is smaller in size than a new data model. The difference data model includes the new model portion and includes a reference (model ID) of the similar data model instead of the similar data model as the base. The reference (model ID) is smaller than the similar data model. Therefore, it is possible to reduce the amount of data to be stored. The block storage layer 302 can add the model ID of the data model including the model ID of the similar data model and the model hash of the data model to the model hash table 402 in S1204.

The block storage layer 302 generates a difference information to be a difference between the data set group in the dirty area and the pattern (data set group output from the data model) (S1205). Data including the difference information generated in S1205, one and more input values based on a data set range of the data set group, and a maximum value and a minimum value in the data set group is an input vector. The block storage layer 302 may compress the difference information and may include the difference information after compression instead of the difference information before the compression in the input vector.

The block storage layer 302 adds the input vector, the model ID of the data model of the data set group, and the key associated with the input vector and the model ID to the key conversion table 401 (S1206).

Figure 13:
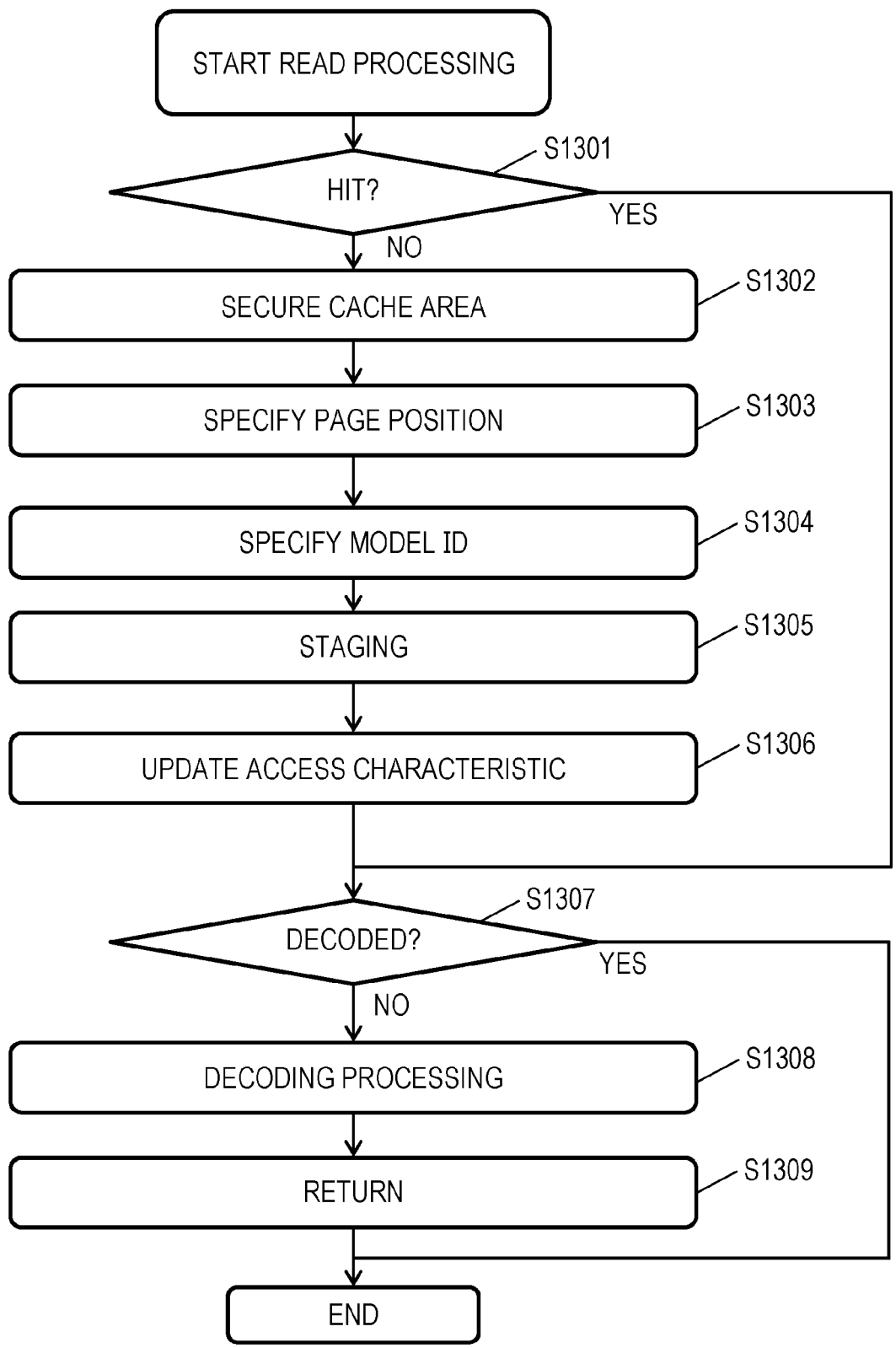
FIG. 13 shows a flow of read processing.

FIG. 13 shows a flow of the read processing.

The read processing starts when a read request is received. The read request is associated with an address of a read source.

The block storage layer 302 determines whether or not a cache hit has occurred (typically, whether or not the data set group to be read exists in the cache memory unit 216) (S1301).

If a determination result in S1301 is false (S1301: N), the block storage layer 302 secures the cache area from the cache memory unit 216 (S1302). The block storage layer 302 specifies the page position (the position in the physical page allocated to the logical page to which the address of the read source belongs (the position corresponding to the address of the read source)) based on the address of the read source, on the basis of the page mapping table 404 (S1303).

The block storage layer 302 specifies the model ID corresponding to the key including the address of the read source from the key conversion table 401 (S1304).

The block storage layer 302 performs staging (S1305). For example, when the model ID is specified in S1304, the block storage layer 302 reads the data model of the specified model ID from the page position specified in S1303 to the cache memory unit 216 (the cache area secured in S1302), on the basis of the configuration table 405, and sets a cache attribute of the cache area as "not decoded". On the other hand, for example, when the model ID is not specified in S1304, the block storage layer 302 reads the data set group from the page position specified in S1303 to the cache memory unit 216 (cache area secured in S1302) and sets the cache attribute of the cache area as "decoded".

The block storage layer 302 updates the access characteristic (I/O load) corresponding to the physical page including the page position (S1306).

After S1306 or when the determination result in S1301 is true (S1301: Y), the block storage layer 302 determines whether or not the attribute of the cache area is "decoded", on the basis of the cache table 403 (S1307).

When a determination result in S1307 is false (S1307: N), the block storage layer 302 performs decoding processing (S1308) of the data model in the cache area.

The block storage layer 302 returns the data set group (the data set group read in S1305 or the data set group restored in the decoding processing) in the cache area (S1309).

The above is the read processing.

After S1304, the block storage layer 302 may determine whether or not a data model (matching data model) in which a matching degree with the data model to be read is equal to or more than the first threshold value already exists in the cache memory unit 216. When a result of the determination is true, the block storage layer 302 may skip S1305. As a result, use efficiency of the cache memory unit 216 is improved.

In addition, the data model and the data set group restored using the data model may be stored in the same cache area or may be stored in different cache areas.

In addition, when a matching data model (for example, a data model with the same model ID) corresponding to the data model read to the cache memory unit 216 exists in the cache memory unit 216, the block storage layer 302 may delete any one of the data model to be read and the matching data model and may associate the address associated with the cache area of the deleted data model with the cache area of the remaining data model. As a result, use efficiency of the cache memory unit 216 is improved.

Figure 14:
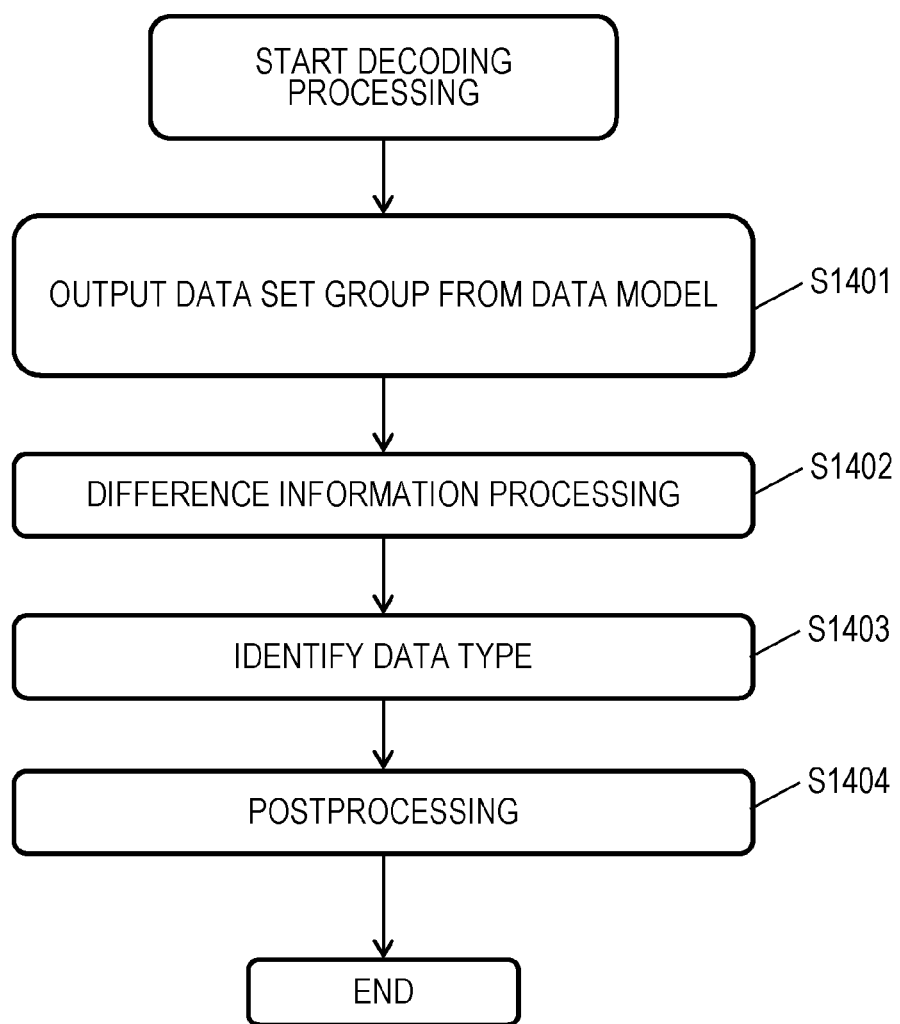
FIG. 14 shows a flow of decoding processing.

FIG. 14 shows a flow of the decoding processing.

The block storage layer 302 obtains a data set group (pattern 103) by inputting the input value 105 in the input vector to the data model in the cache memory unit 216 (S1401). The input vector is an input vector specified from the key conversion table 401, which corresponds to the key including the address of the read source. When the data model is a difference data model, the following may be performed in S1401.

The block storage layer 302 acquires a data model corresponding to the model ID of the difference data model.

The block storage layer 302 acquires a new data model by applying a model portion in the difference data model to the acquired data model.

The block storage layer 302 inputs the input value in the input vector corresponding to the key including the address of the read source to the acquired new data model.

The block storage layer 302 performs difference information processing (S1402). Specifically, the block storage layer 302 reflects the difference information 106, the minimum value 107, and the maximum value 108 in the input vector in the pattern 103 obtained in S1401.

The block storage layer 302 identifies a type (for example, a type such as a moving image, a still image, and CSV data) of the data set group obtained in S1402 (S1403). In addition, the block storage layer 302 performs postprocessing (for example, column integration or frame integration for each data type) (S1404).

By the decoding processing, the data set group is restored from the data model.

Second Embodiment

A second embodiment will be described. At this time, a different point with the first embodiment will mainly be described and description of a common point with the first embodiment will be omitted or simplified.

Figure 15:
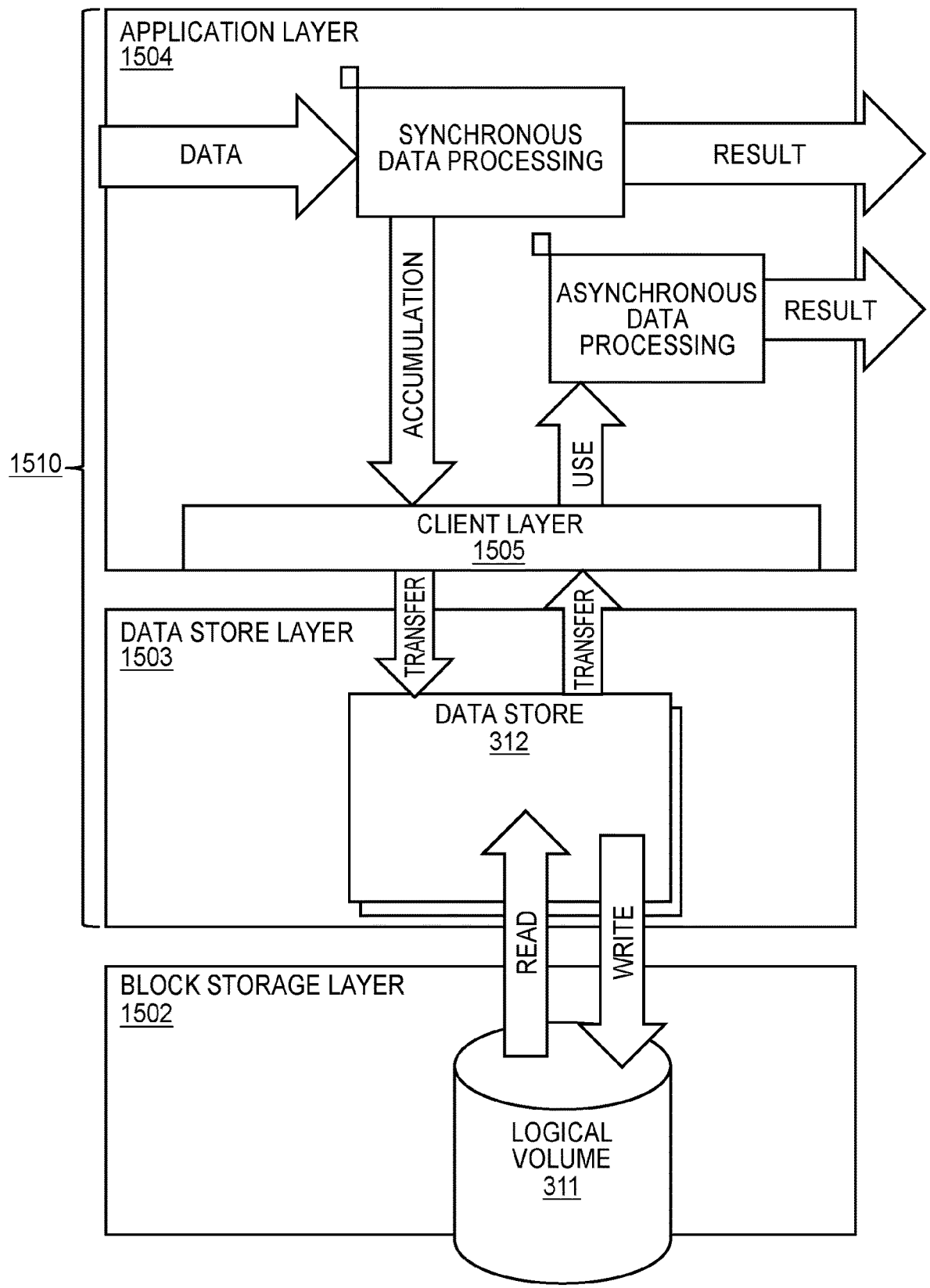
FIG. 15 shows a logical hierarchical structure of a system according to a second embodiment.

FIG. 15 shows a logical hierarchical structure of a system according to the second embodiment.

A system (a storage system 1510 according to the second embodiment or a system including the storage system 1510) provides a block storage layer 1502, a data store layer 1503, and an application layer 1504. A client layer 1505 exists in the application layer 1504 (or between the data store layer 1503 and the application layer 1504). The storage system 1510 provides at least the data store layer 1503. At least one node 201 functioning as a host such as a server provides the application layer 1504 (and the client layer 1505). However, the storage system 1510 may include at least one node 201. Each of these layers 1502 to 1505 may be a function provided by executing one or more computer programs by a processor unit 215 of one or more nodes 201. For example, the block storage layer 1502, the data store layer 1503, the application layer 1504, and the client layer 1505 may be replaced with a block storage program, a data store program, an application program, and a client program, respectively. The application layer 1504 (and the client layer 1505) is at least a part of a front-end layer that writes an input data set group to a memory unit. The data store layer 1503 is at least a part of a back-end layer that writes a data model of the data set group and an input vector corresponding to the data model to a PDEV unit. The "memory unit" mentioned here is a client memory area unit. The "client memory area unit" is a memory area unit in the node 201 providing the client layer 1505 and is a memory area unit managed by the client layer 1505. The client memory area unit is, for example, a so-called main memory. On the other hand, there is a memory area unit in the node 201 providing the data store layer 1503, which is managed by the data store layer 1503, and the memory area unit is a "store memory area unit". At least one of the client memory area unit and the store memory area unit may be the memory unit in the storage system 1510. In addition, a processor unit that provides the application layer 1504 (and the client layer 1505) and a processor unit that provides the data store layer 1503 may be a processor unit in the storage system 1510.

Any one of the data store layer 1503 and the client layer 1505 (or the application layer 1504) may perform encoding processing. In this embodiment, the data store layer 1503 does not perform decoding processing and the client layer 1505 (or the application layer 1504) can perform the decoding processing. That is, the data store layer 1503 returns the data model and the input vector to the client layer 1505 and the client layer 1505 writes the data model and the input vector to the client memory area unit. When the client layer 1505 uses the data set group, the client layer 1505 performs the decoding processing including processing for restoring the data set group from the data model in the client memory area unit, thereby obtaining the data set group. As a result, as compared with the case where the data set group is always developed in the client memory area unit (main memory), a used memory capacity of the client memory area unit is small. Therefore, use efficiency of the client memory area unit (main memory) is high. In addition, because data transferred from the data store layer 1503 (for example, a certain node 201) to the client layer 1505 (for example, another node 201) has a data model and an input vector expected to have a smaller data amount than the data set group, it can be expected that an uplink transfer amount (an amount of data transferred from the data store layer 1503 to the client layer 1505) is reduced. If the client layer 1505 (or the application layer 1504) performs the encoding processing, it can be expected that a downlink transfer amount (an amount of data transferred from the client layer 1505 to the data store layer 1503) is also reduced.

In the encoding processing according to the first embodiment, encoding processing of reversible conversion, specifically, encoding processing in which the same (error-free) data set group as the data set group before the encoding processing can be restored by the decoding processing is performed. This is to maintain returning the same data as actually stored data to the layer 303 or 304 on the block storage layer 302.

On the other hand, the encoding processing according to the second embodiment may be encoding processing of reversible conversion or may be encoding processing of irreversible conversion. Specifically, the encoding processing according to the second embodiment includes processing for generating error information to be information based on an error between a data set group to be written and a data set group output from the data model and an allowable error. That is, in the second embodiment, the error information is adopted instead of difference information 106. The data store layer 1503 (or the client layer 1505) writes, to a storage unit, an input vector including the generated error information in addition to a data model associated with a key of the data set group to be written. The data set group restored in the decoding processing according to the second embodiment is a data set group obtained by correcting the data set group output from the data model by using the error information in the input vector associated with the data model. If the allowable error is 0 (that is, no error is allowed at all), the restored data set group is the same as the data set group before the encoding processing. If the allowable error is larger than 0, there is an error less than the allowable error between the restored data set group and the data set group before the encoding processing. In this embodiment, a first threshold value (threshold value used in matching determination) is a variable value and tends to be small when the allowable error is large. When the allowable error is larger than 0, at least one of the following can be expected, so that further data amount reduction can be expected.

The error information is easier to compress than the difference information 106.

A matching range of the data model extends, which results in more data models that can be deleted.

Hereinafter, the second embodiment is described in more detail.

Figure 16:
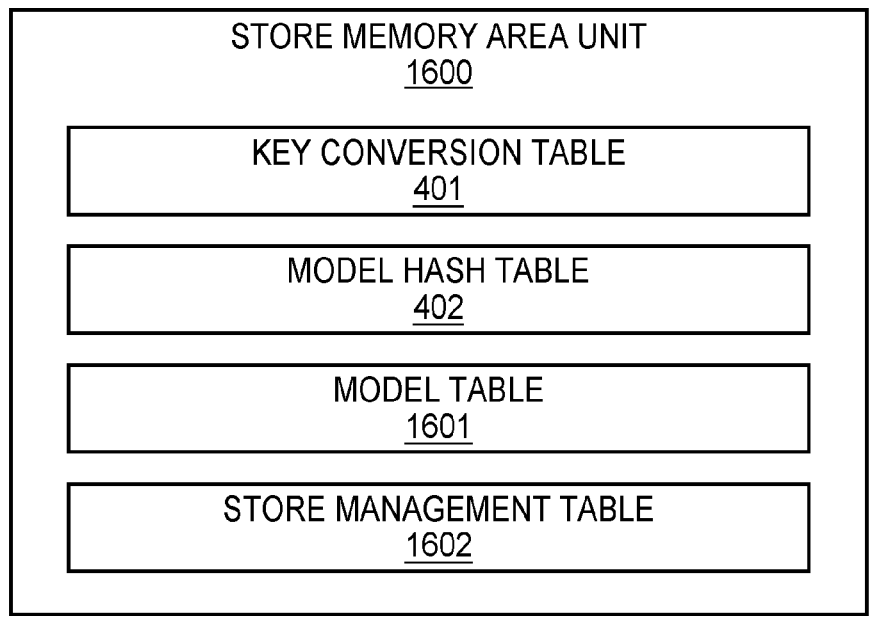
FIG. 16 shows a table stored in a store memory area unit.

FIG. 16 shows a table stored in the store memory area unit.

A store memory area unit 1600 stores a key conversion table 401, a model hash table 402, a model table 1601, and a store management table 1602.

Figure 17:
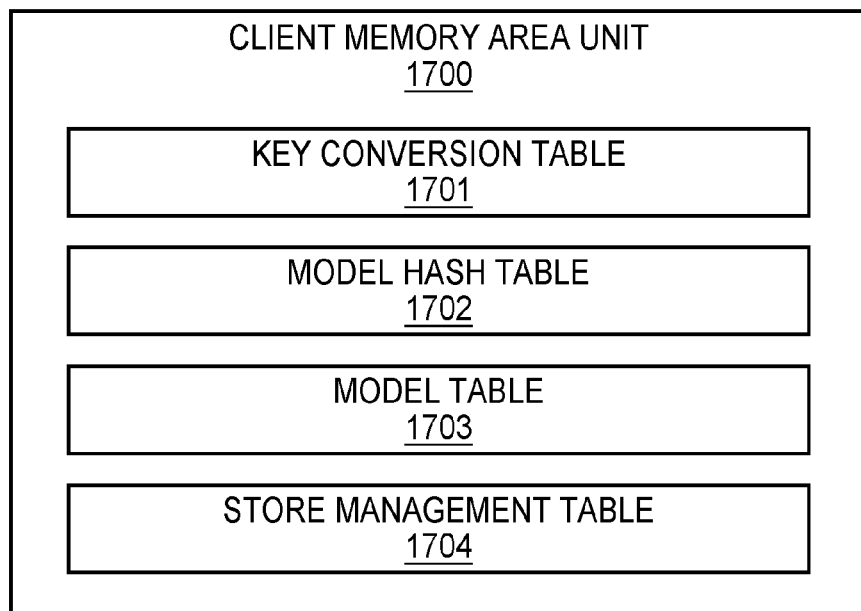
FIG. 17 shows a table stored in a client memory area unit.

FIG. 17 shows a table stored in the client memory area unit.

A client memory area unit 1700 stores a key conversion table 1701, a model hash table 1702, a model table 1703, and a store management table 1704.

At least a part of each of the tables 1701 to 1704 and at least a part of each of the tables 401, 402, 1601, and 1602 are synchronized (have the same contents). For example, when one of the tables 401 and 1701 is updated, the other table is also updated with the same contents.

Figure 18:
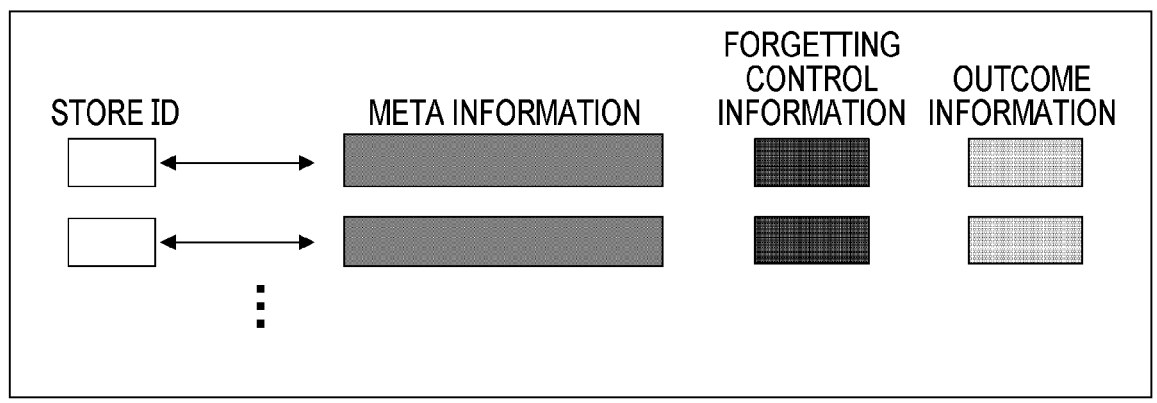
FIG. 18 shows a configuration of a store management table.

FIG. 18 shows a configuration of the store management table 1602.

The store management table 1602 stores information on the data store 312. For example, the store management table 1602 has a record for each data store 312. Each record stores information such as a store ID (ID of the data store 312), meta information, forgetting control information, and outcome information.

The meta information is meta information of the data store 312 and includes at least one of a column number, a column name, a start time, and an input frequency, for example. The meta information further includes an allowable error. The allowable error may be associated in a unit of a data model instead of being associated in a unit of the data store 312. The meta information may further include a first threshold value (a threshold value used in matching determination).

The forgetting control information is information for controlling forgetting of the data store 312, specifically, information for adjusting an allowable error corresponding to the data store 312 and a correction error of a data set in which an error is outside a range of the allowable error among data set groups output from the data model belonging to the data store 312. In this embodiment, an output data set in which an error is within the range of the allowable error is corrected on the basis of the error and the range of the allowable error. However, the "correction error" is an error of the corrected output data set. The forgetting control information may be, for example, forgetting curve information. The forgetting curve information is information showing a dynamic change (for example, a forgetting curve of Ebbinghaus) of a memory degree (for example, a resolution, a frequency, or the like) over time. The forgetting curve information is referred to in first error adjustment processing to be adjustment processing of the correction error. In this embodiment, in addition to (or instead of) the first error adjustment processing, second error adjustment processing to be adjustment processing of the allowable error can be performed. At least one of the first and second error adjustment processing may be performed at occurrence timing of use processing to be described later, may be performed at update timing of the outcome information, or may be performed at timing when a use rate of the entire data store 312 exceeds the threshold value.

The outcome information includes aim information (for example, a key performance indicator (KPI)) to be information showing an aim (for example, an aim of the application layer 1504 such as a data analysis application) and achievement degree information to be information showing an aim achievement degree. The achievement degree information may be set from the application layer 1504, for example. The outcome information may further include a lower limit value of the aim achievement degree.

Figure 19:
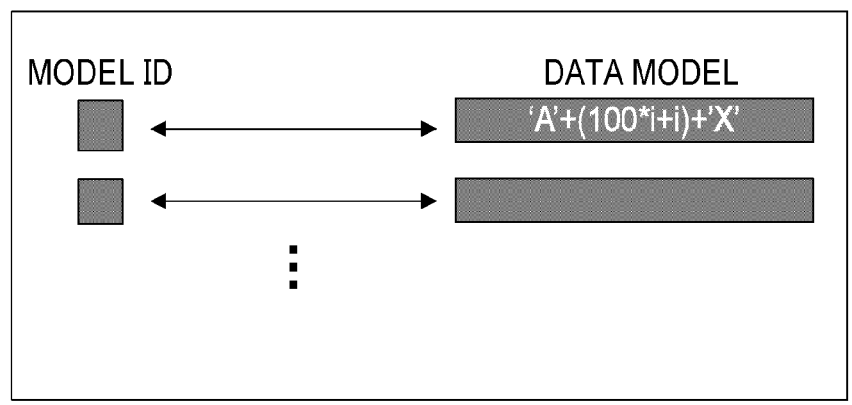
FIG. 19 shows a configuration of a model table.

FIG. 19 shows a configuration of the model table 1601.

The model table 1601 has a record for each data model. Each record stores a model ID and a data model.

Figure 20:
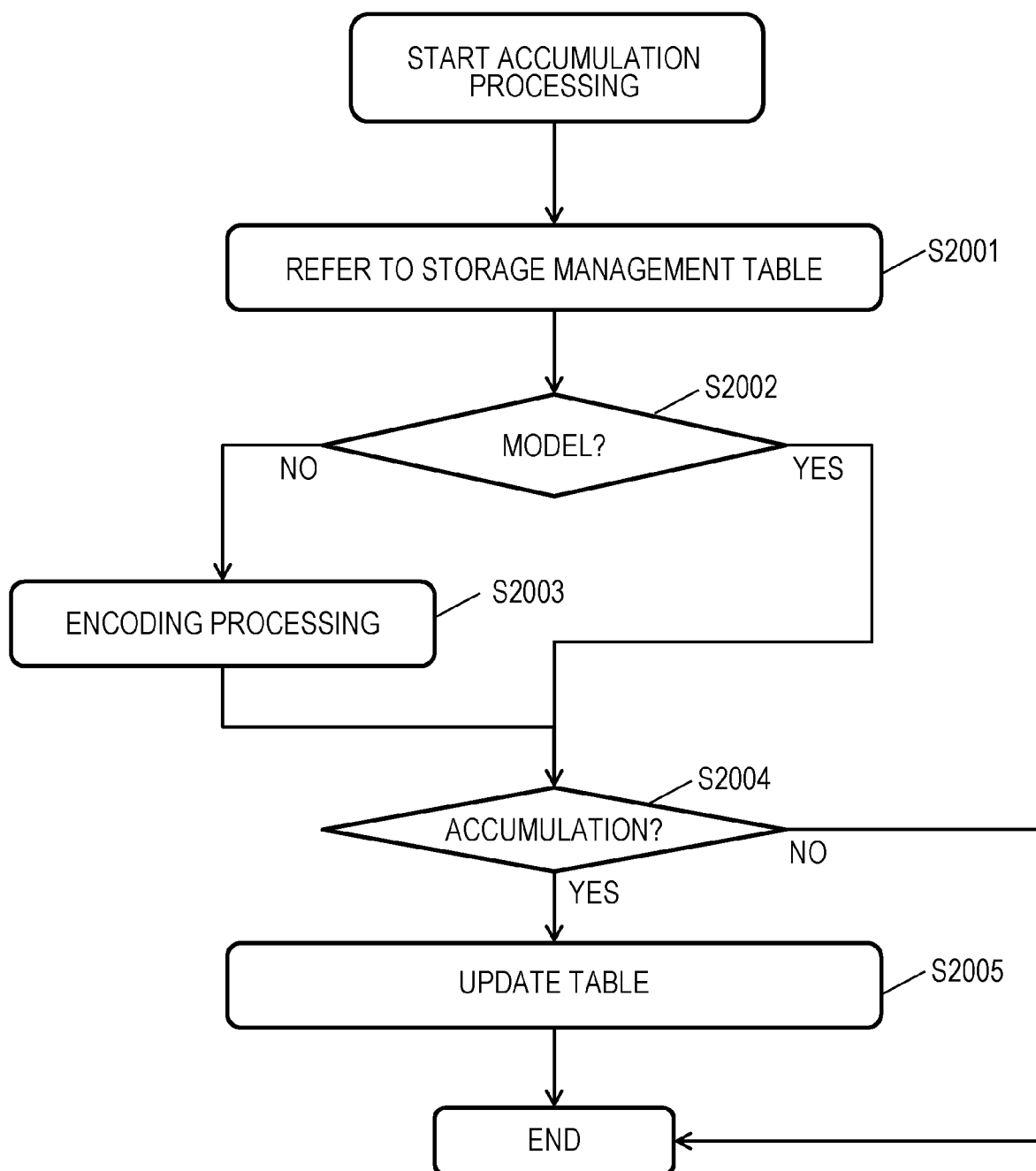
FIG. 20 shows a flow of accumulation processing.

FIG. 20 shows a flow of accumulation processing.

The accumulation processing is an example of write processing and is processing performed when an accumulation request specifying the data store 312 is input to an application programming interface (API) of the data store layer 1503. The accumulation request is associated with a store ID, a mode ID, a key, and an accumulation target (data model or data set group). As the mode ID, any one of a "model" (an accumulation target is a data model) and a "data set group" (an accumulation target is a data set group) is specified. In addition, the key may include at least a part (for example, information corresponding to an address of an accumulation destination) of record information such as a column name and a time.

The data store layer 1503 refers to a record (record in the store management table 1602) corresponding to the specified store ID (S2001) and determines whether or not the specified mode ID is the "model" (S2002). When a determination result in S2002 is false (S2002: N), the data store layer 1503 performs encoding processing (refer to FIG. 22) of a data set group to be accumulated (S2003).

When the determination result in S2002 is true (S2002: Y) or after S2003, the data store layer 1503 determines whether or not accumulation is performed (S2004). If a matching data model is found in the encoding processing (S2003), a determination result in S2004 is true. If the matching data model is not found in the encoding processing (S2003), the determination result in S2004 is false. When the encoding processing (S2003) is not performed, matching determination on whether or not there is a data set group matched with the data set group to be accumulated may be performed in S2004 or the determination is not performed and the determination result in S2004 may be true.

When the determination result in S2004 is true (S2004: Y), the data store layer 1503 performs table update (S2005). Specifically, the data store layer 1503 adds the data model (the data model associated with the accumulation request or the data model generated in the encoding processing (S2003)) of the accumulation target and a model ID of the data model to the model table 1601. In addition, the data store layer 1503 adds the key associated with the accumulation request, the model ID of the data model, and the input vector corresponding to the data model to the key conversion table 401.

Figure 21:
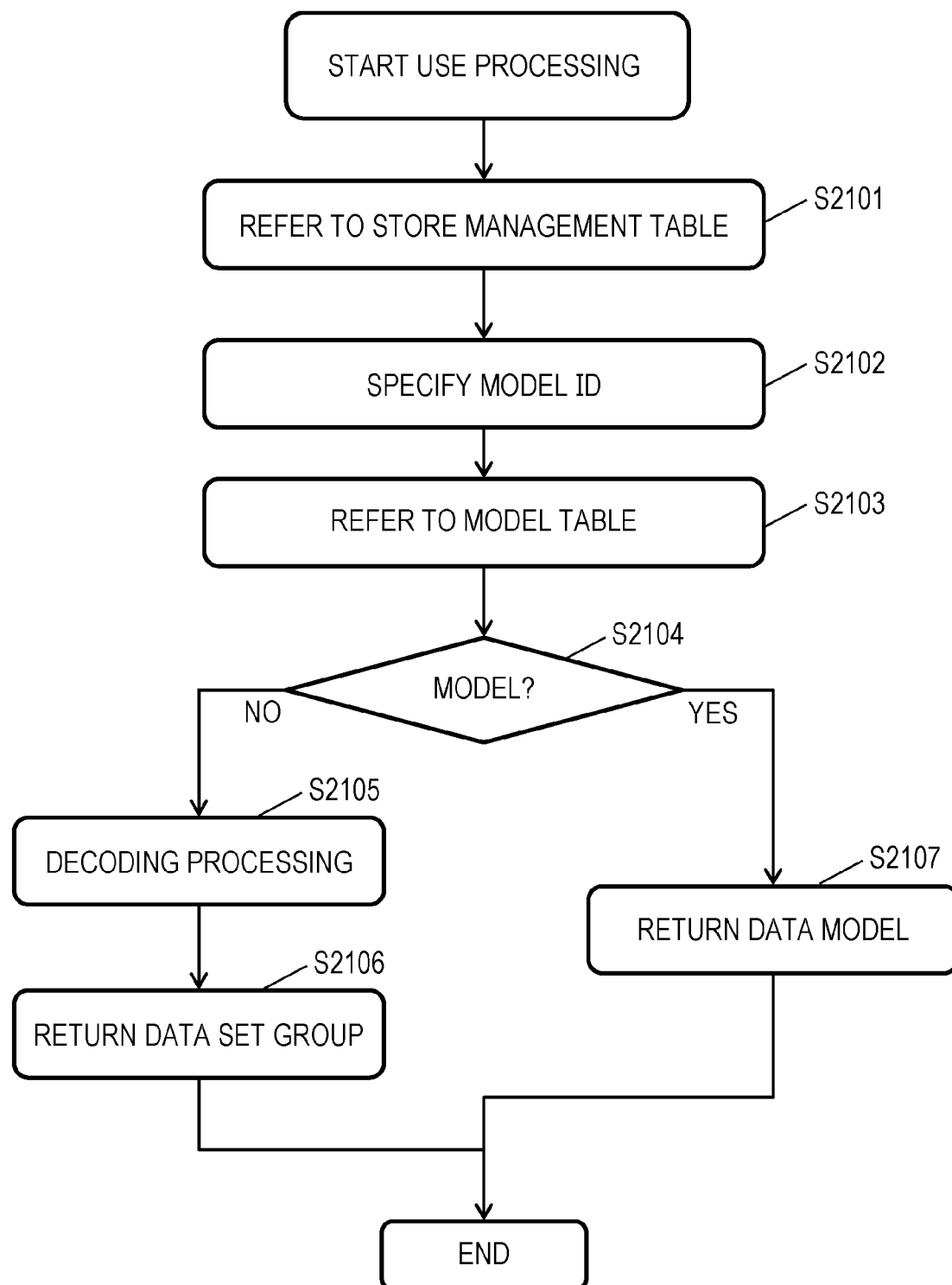
FIG. 21 shows a flow of use processing.

FIG. 21 shows a flow of use processing.

The use processing is an example of read processing and is processing performed when a use request specifying the data store 312 is input to the API of the data store layer 1503. The use request is associated with a store ID, a mode ID, and a key. As the mode ID, any one of a "model" (data model return) and a "data set group" (data set group return) is specified. In addition, the key may include at least a part (for example, information corresponding to an address of an accumulation destination) of record information such as a column name and a time.

The data store layer 1503 refers to a record (record in the store management table 1602) corresponding to the specified store ID (S2101) and specifies the model ID and the input vector corresponding to the key associated with the use request, from the key conversion table 401 (S2102). The data store layer 1503 specifies the data model corresponding to the specified model ID from the model table 1601 (S2103). The data store layer 1503 determines whether or not the mode ID is a "model" (S2104).

When a determination result in S2104 is false (S2104: N), the data store layer 1503 performs decoding processing (refer to FIG. 14) for inputting the specified input vector to the specified data model and restoring the data set group (S2105). In addition, the data store layer 1503 returns the restored data set group (S2106).

When the determination result in S2104 is true (S2104: Y), the data store layer 1503 returns the specified data model (and the input vector) (S2107). In this case, a transfer amount between the data store layer 1503 and the client layer 1505 is reduced as compared with a transfer amount in S2106. The data model (and the input vector) returned in S2107 is stored in the client memory area unit 1700. At the time of using the data set group restored from the data model (and the input vector), the client layer 1505 performs the decoding processing using the data model (and the input vector). As a result, as compared with the case where the data set group is always developed in the client memory area unit 1700, a used memory capacity of the client memory area unit 1700 is small. Therefore, use efficiency of the client memory area unit 1700 is high. In addition, the client layer 1505 can determine whether or not the data model to be used exists in the client memory area unit 1700. Because a comparison target is not the data set group but the data model (or the model hash), improvement of a hit ratio can be expected.

Figure 22:
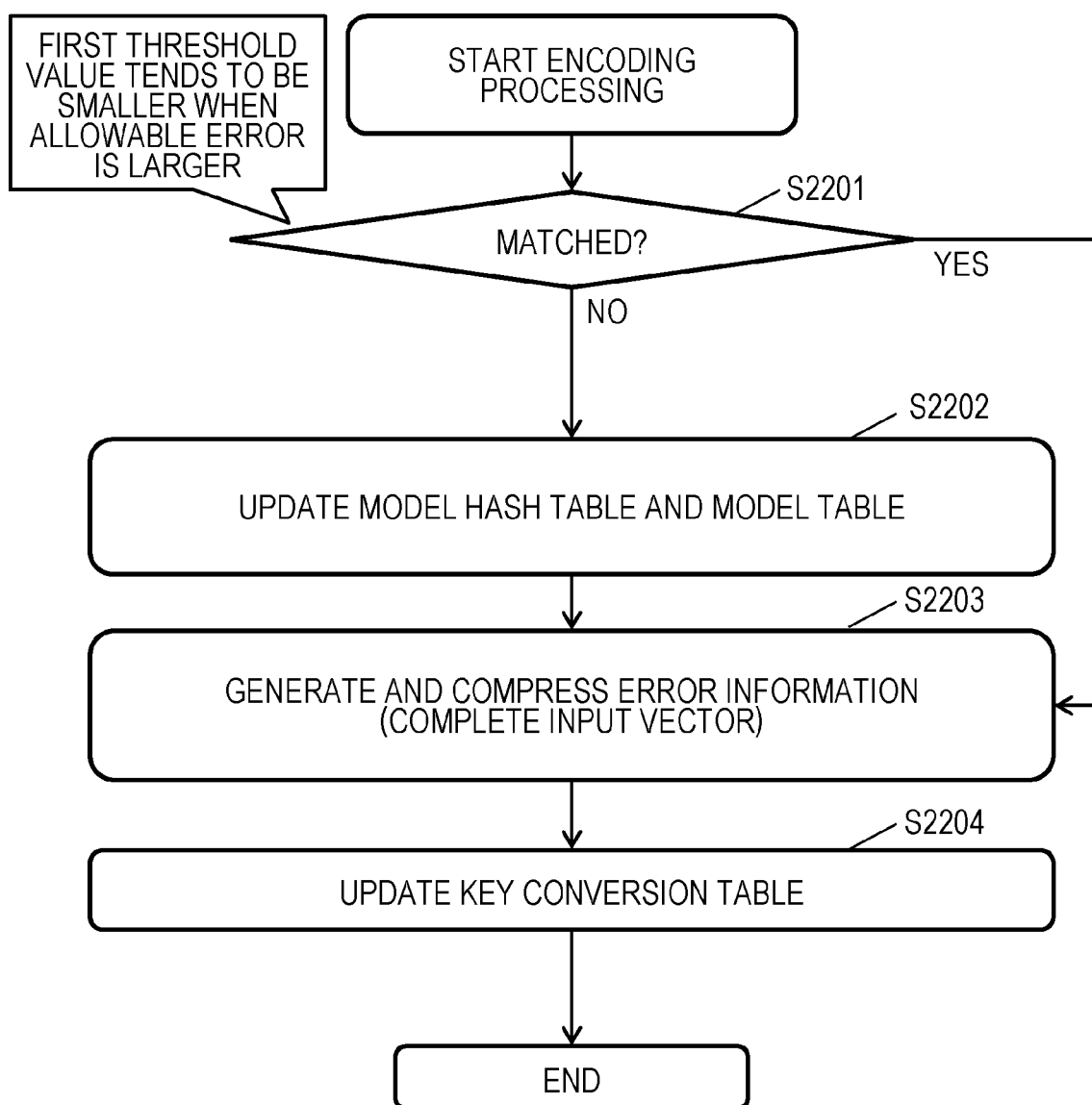
FIG. 22 shows a flow of encoding processing according to the second embodiment.

FIG. 22 shows a flow of encoding processing according to the second embodiment.

In the second embodiment, because a layer on the block storage layer 1502 performs the encoding processing, processing corresponding to S1201 and S1202 of FIG. 12 is unnecessary.

The data store layer 1503 performs matching determination on whether or not there is a matching data model to be a data model in which a matching degree with the data model of the accumulation target is equal to or more than the first threshold value (S2201). A main difference with S1203 of FIG. 12 is that the first threshold value to be referred to is a variable value and tends to be small when the allowable error corresponding to the data store to which the data model belongs is large.

If a determination result in S2201 is true (S2201: Y), the data store layer 1503 generates error information to be information based on the error between the data set group and the pattern (data set group output from the matching data model) and the allowable error, compresses the generated error information, and completes a new input vector (S2203). The data store layer 1503 updates the key conversion table 401 (S2204). S2204 may be the same as S1206 of FIG. 12. Specifically, for example, the data store layer 1503 newly associates a new key including an address of the write destination and a new input vector (input vector including the compressed error information) generated in S2203 with a model ID of the matching data model.

When the determination result in S2201 is false (S2201: N), the data store layer 1503 updates the model hash table 402 and the model table 1601 (S2202). For example, the data store layer 1503 adds the calculated model hash and the model ID of the generated data model to the model hash table 402 and adds the model ID of the generated data model and the generated data model to the model table 1601. The data store layer 1503 generates error information to be information based on the error between the data set group and the pattern (data set group output from the data model) and the allowable error and compresses the generated error information (S2203). The error information may be, for example, an array of a plurality of correction values corresponding to a plurality of data set groups forming the pattern. In addition, the data store layer 1503 performs S2204.

Figure 23:
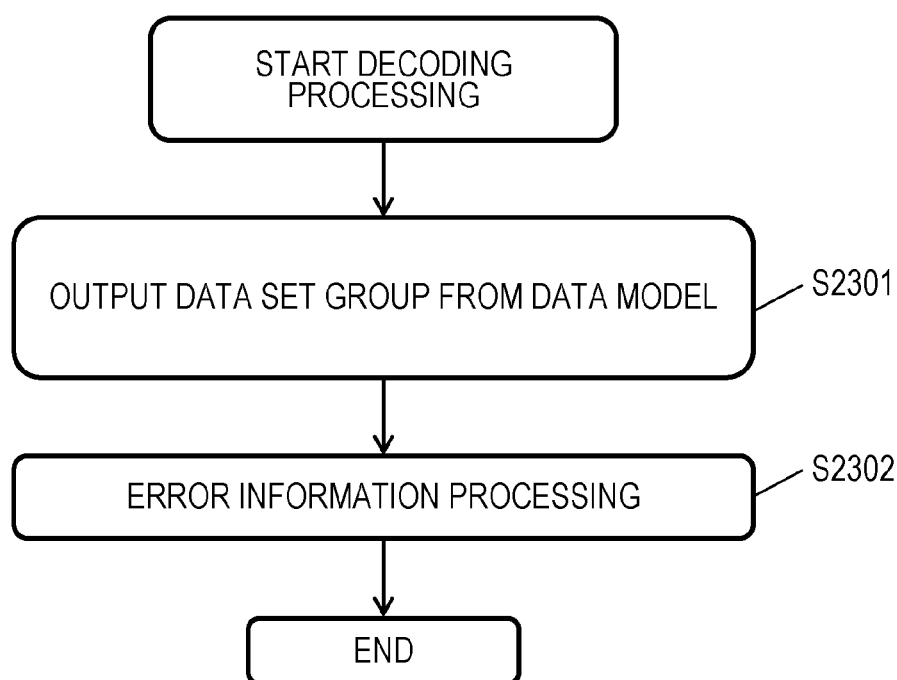
FIG. 23 shows a flow of decoding processing according to the second embodiment.

FIG. 23 shows a flow of decoding processing according to the second embodiment. The decoding processing can be performed by both the data store layer 1503 and the client layer 1505. However, here, the client layer 1505 is taken as an example.

In the second embodiment, because a layer on the block storage layer 1502 performs the decoding processing, processing corresponding to S1403 and S1404 of FIG. 14 is unnecessary.

The client layer 1505 obtains a data set group (pattern) by inputting an input value in the input vector to the data model in the client memory area unit 1700 (S2301).

The client layer 1505 performs error information processing (S2302). Specifically, the client layer 1505 corrects the pattern obtained in S2301, using the error information of the input vector.

Figure 24:
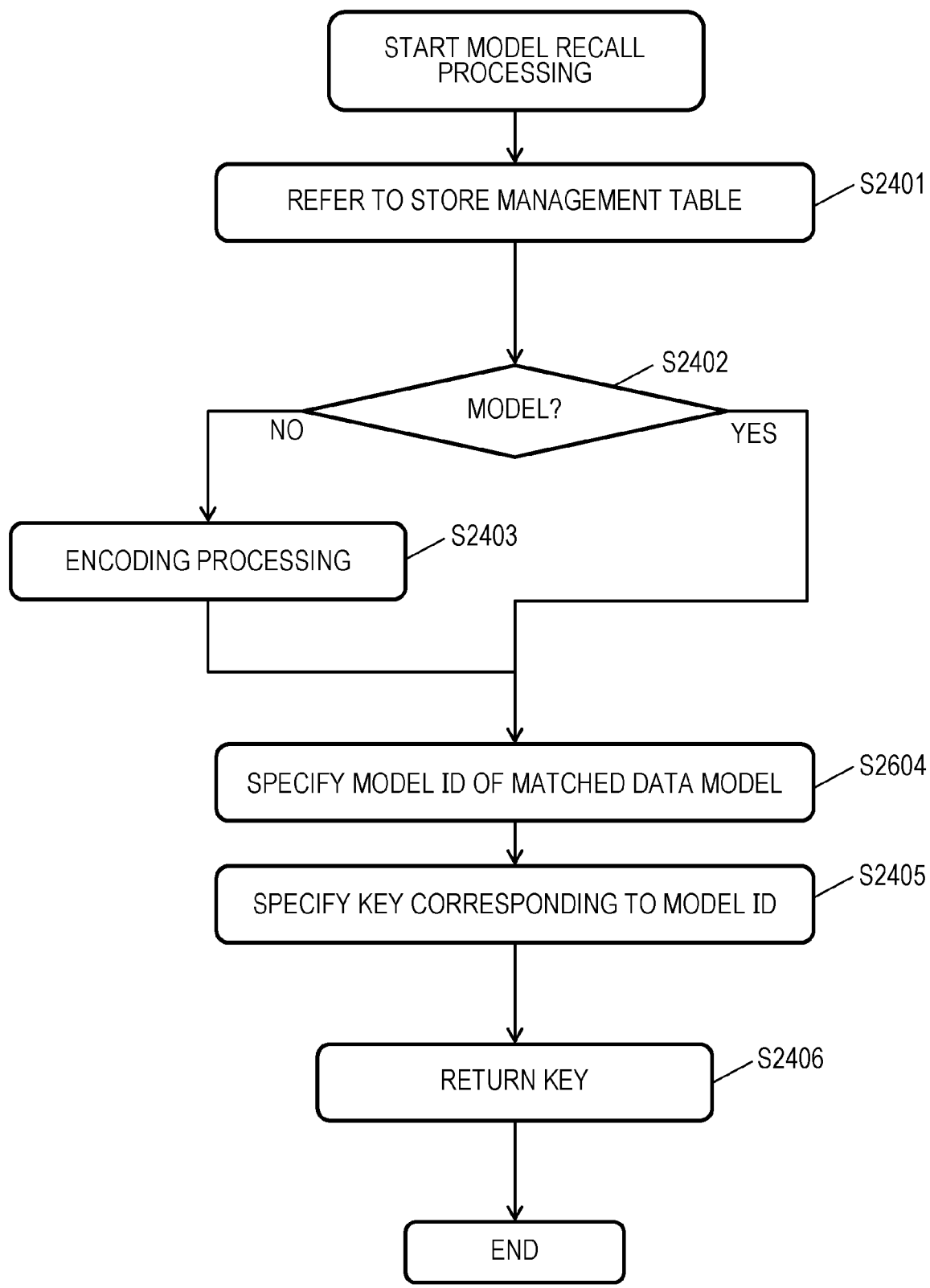
FIG. 24 shows a flow of model recall processing.

FIG. 24 shows a flow of model recall processing.

The model recall processing is an example of search processing and is processing performed when a recall request specifying the data store 312 is input to the API of the data store layer 1503. The recall request is associated with a mode ID and a search condition. As the mode ID, any one of a "model" (input of a data model) and a "data set group" (input of a data set group) is specified. In addition, the search condition includes the data model (or a model hash thereof) or a data set group. In addition, the search condition may include any kind of conditions such as model ID, a column name, and a data set range.

The data store layer 1503 refers to the store management table 1602 (S2201) and determines whether or not the mode ID is a "model" (S2202). When a determination result in S2202 is false (S2202: N), the data store layer 1503 performs encoding processing (refer to FIG. 12) of the data set group included in the search condition (S2203).

When the determination result in S2202 is true (S2202: Y) or after S2203, the data store layer 1503 searches a model hash in which a matching degree with a model hash (a model hash of the input data model or a model hash of the data model generated in S2203) of a comparison target is equal to or larger than the predetermined value, from the model hash table 402 (S2204). The data store layer 1503 specifies a key associated with a model ID corresponding to the found model hash, from the key conversion table 401 (S2205). The data store layer 1503 returns the specified key (S2206).

As described above, because the target referred to in the search processing is a model hash (or a data model) having a smaller data amount than the data set group, high-speed processing can be expected. Because the returned target is not the data set group but the resultant key, a transfer amount can be reduced.

Figure 25:
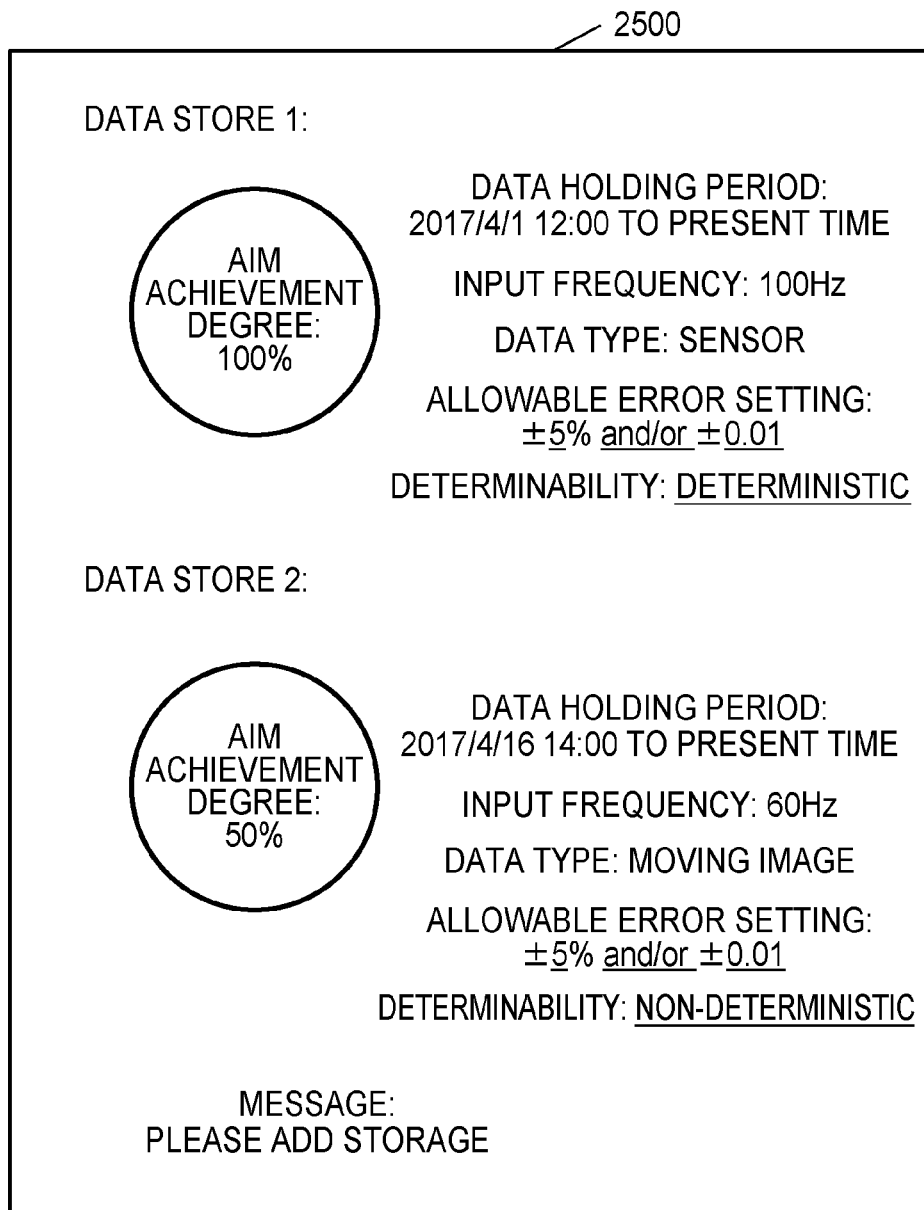
FIG. 25 shows an example of a GUI (outcome setting)

FIG. 25 shows an example of a GUI (outcome setting).

The data store layer 1503 displays a graphical user interface (GUI) 2500 exemplified in FIG. 25, on the basis of the store management table 1602. Instead of the GUI, other types of screens may be adopted.

The data store layer 1503 displays, for example, the following for each data store 312.

Aim achievement degree of outcome information,
Data holding period in meta information (period from a date and time when data is stored in the data store 312),
Data type in meta information,
Allowable error in meta information, and
Determinability in meta information.

The aim achievement degree may be information input by a user or may be information that is regularly calculated and updated by a predetermined method.

The "allowable error" may be specified, for example, by a ratio or may be specified by a constant value (for example, if a constant value of 0.01 is specified, values up to two decimal places are valid).

The "determinability" means whether or not to maintain returning the same data set group whenever a use request is received for the data store 312. "Deterministic" means that returning the same data set group is maintained. "Non-deterministic" means that returning the same data set group is not maintained. The forgetting control information corresponding to the data store 312 in which "deterministic" has been adopted shows information showing that there is no forgetting, that is, that both the first and second error adjustment processing is not performed. This is because, if the correction error or the allowable error dynamically changes, the restored data set group is different.

In FIG. 25, an underlined information element is an example of an information element that can be set and changed by the user. That is, in this embodiment, whether to specify the allowable error by any one (both) of the ratio and the constant value and determinability are information elements that can be set and changed by the user.

For a "data store 2", there is a presentation of an increase in the storage capacity such as "please add a storage". However, in this case, to cause the aim achievement degree to become the achievement degree desired by the user, it is essential to reduce the error after this. As a result, it is expected that a reduction degree in the data amount decreases. When a sufficient empty storage capacity already exists, the presentation may not be necessary. At least one of the data store layer 1503 and the client layer 1505 may determine whether or not the aim achievement degree corresponding to the data store 312 is equal to or more than the achievement degree desired by the user regularly or irregularly (for example, when a display request of the GUI 2500 is received from the user or when he second error adjustment processing is performed) and may present the storage addition, when a determination result is false. The determination may be performed on the basis of the previously input achievement degree (the lower limit value of the aim achievement degree in the outcome information) desired by the user or after a response for whether or not the achievement degree desired by the user is satisfied is received from the user, the determination may be performed on the basis of the response.

Figure 26:
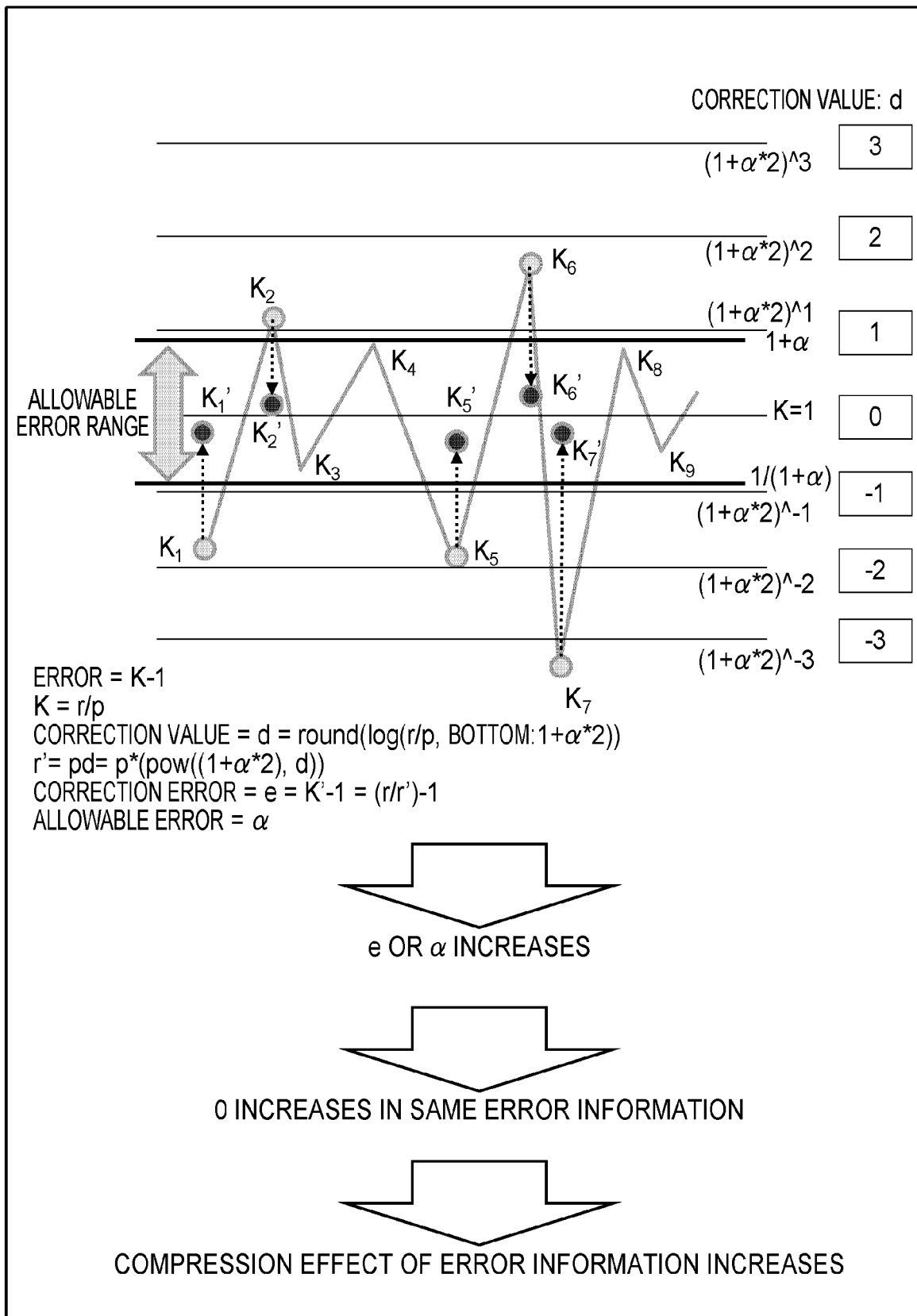
FIG. 26 shows an example of a relation between an allowable error and a correction value.

FIG. 26 shows an example of a relation between an allowable error and a correction value. In the second embodiment, it is premised that each data set (value) forming the data set group before modeling has a positive real number. However, even if at least one data set of the data set group before modeling has a negative value, positive/negative information is held, so that the present invention can be applied. FIG. 26 is based on an example of the case where the error is specified by the ratio (error rate). However, the present invention can also be applied to the case where the error is specified by a constant value.

In FIG. 26, K (each of $K_1$ to $K_9$) is r/p. r is a data set in the data set group before modeling and p is a data set in the pattern. Therefore, when there is no error, K=1 is satisfied. Therefore, the error=K−1 is satisfied. When K deviates from 1, the error increases.

In addition, in FIG. 26, the allowable error is α. When K is used as a base, the allowable error range is expressed as $1/(1+\alpha)$ or more and $1+\alpha$ or less.

The error information is an array of a plurality of correction values d corresponding to a plurality of output data sets forming the pattern (data set group output from the data model). d (and the number of digits of d) tends to be larger when as α or e (correction error) is smaller. In other words, d (and the number of digits of d) tends to be smaller as a or e is larger. When a or e decreases, d approaches 0 (an example of a predetermined value). Therefore, when α or e is smaller, 0 is larger in the error information and as a result, compression of the error information becomes easier. As described above, the error information is generated in the encoding processing.

In this embodiment, correction is unnecessary for the output data set corresponding to K within the allowable error range, that is, d=0. According to the example of FIG. 26, it is unnecessary to correct an output data set corresponding to each of $K_2$, $K_4$, $K_8$, and $K_9$.

On the other hand, correction is necessary for a data set corresponding to K outside the allowable error range, that is, d>0. Specifically, d is determined such that K becomes K' within the allowable error range. K'=r/r' is satisfied. r'=pd, that is, r' is p corrected using d. If there is no error in the corrected data set r', K'=1 is satisfied. According to the example of FIG. 26, the correction values d of the output data sets corresponding to $K_1$, $K_2$, $K_5$, $K_6$, and $K_7$ are determined such that $K_1$, $K_2$, $K_5$, $K_6$, and $K_7$ become $K_1'$, $K_2'$, $K_5'$, $K_6'$, and $K_7'$ in the allowable error range, respectively. Specifically, the correction value d is a value obtained by rounding off a value of log (r/p, bottom: $1+\alpha*2$) at the first decimal place. r' is $p*(1+\alpha*2)^d$. The correction error e is K'−1=(r/r')−1. e≤α is satisfied.

The flow of the first and second error adjustment processing will be described below. The first and second error adjustment processing may be performed by any one of the data store layer 1503 and the client layer 1505. However, in this embodiment, it is assumed that the data store layer 1503 performs the first and second error adjustment processing.

Figure 27:
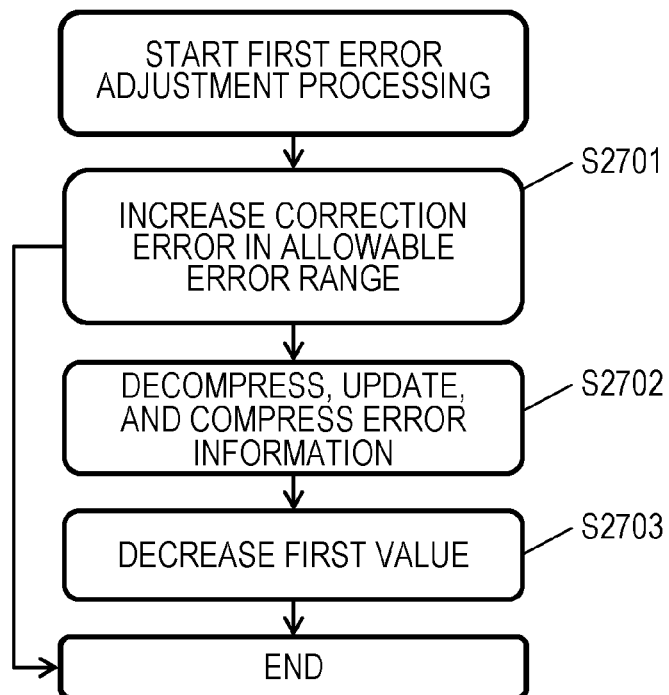
FIG. 27 shows a flow of first error adjustment processing.

FIG. 27 shows a flow of the first error adjustment processing. The first error adjustment processing is performed for each data store 312, for example. Hereinafter, one data store 312 is taken as an example (in the description of FIG. 27, the "target data store 312").

The data store layer 1503 increases the correction error within the allowable error range (S2701). Specifically, for example, the data store layer 1503 performs the following processing. By the processing described below, a correction value of the output data set corresponding to the increased correction error is updated.

The data store layer 1503 specifies the allowable error corresponding to the target data store 312 from the store management table 1602.

The data store layer 1503 specifies the data model belonging to the target data store 312, on the basis of the key conversion table 401.

For an output data set having the correction error (according to the example of FIG. 26, e=r/r'−1) in one or more output data sets forming the data set group output from the specific data model, the data store layer 1503 increases the correction error of the output data set within the allowable error range, according to a predetermined rule. The "predetermined rule" is a rule shown by the forgetting control information corresponding to the target data store 312.

For each data model belonging to the target data store 312, the data store layer 1503 reads the error information in the input vector from the key conversion table 401, decompresses the read error information in the input vector, updates the decompressed error information on the basis of the result of step S2701, compresses the updated error information, and writes (for example, overwrites) the input vector including the compressed error information to the key conversion table 401 (S2702).

The data store layer 1503 decreases the first threshold value, on the basis of the result (for example, an average value of the correction error) of S2701 (S2703). A relation between the correction error and the first threshold value may be previously defined. S2703 is performed on the basis of the relation. Even in the case where S2701 is performed, if it is not necessary to change the first threshold value (for example, if a change in the correction error is small enough not to change the first threshold value), S2703 may be skipped.

Figure 28:
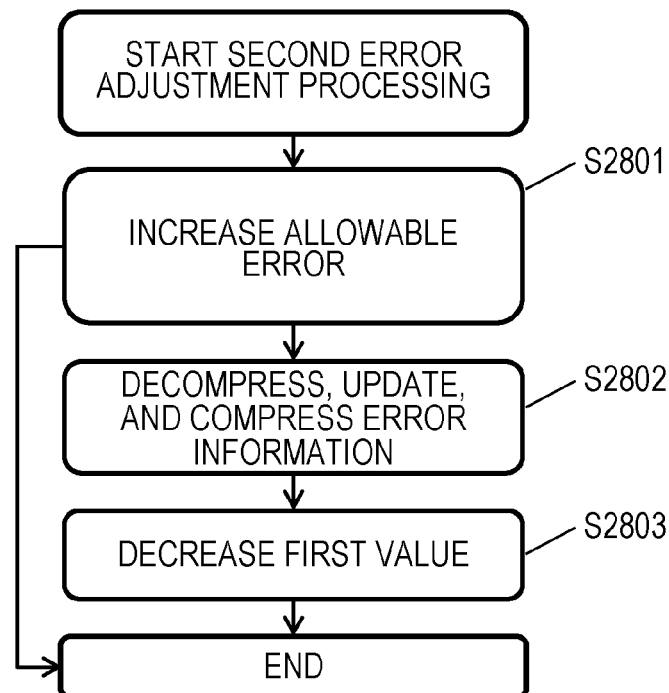
FIG. 28 shows a flow of second error adjustment processing.

FIG. 28 shows a flow of the second error adjustment processing. The second error adjustment processing is performed for each data store 312, for example. Hereinafter, one data store 312 is taken as an example (in the description of FIG. 28, the "target data store 312").

The data store layer 1503 increases the allowable error (S2701). Specifically, for example, the data store layer 1503 performs one of the following processing. By the processing described below, each correction value in the error information corresponding to the data model belonging to the target data store 312 is updated.

The data store layer 1503 receives the allowable error increased by the user as an allowable error corresponding to the target data store 312 and sets the allowable error to the store management table 1602.

The data store layer 1503 specifies the allowable error corresponding to the target data store 312 from the store management table 1602. If the aim achievement degree in the outcome information corresponding to the target data store 312 is relatively high (for example, if the current aim achievement degree is higher than the achievement degree desired by the user), the data store layer 1503 increases the allowable error. An increase amount in the allowable error may be determined on the basis of at least one of a previously defined relation between the aim achievement degree and the allowable error and a past history of the relation between the aim achievement degree and the allowable error.

For each data model belonging to the target data store 312, the data store layer 1503 reads the error information in the input vector from the key conversion table 401, decompresses the read error information in the input vector, updates the decompressed error information on the basis of the result of S2801, compresses the updated error information, and writes (for example, overwrites) the input vector including the compressed error information to the key conversion table 401 (S2802).

The data store layer 1503 decreases the first threshold value on the basis of the result (for example, the allowable error after updating) of S2801 (S2803). The relation between the allowable error and the first threshold value may be previously defined, for example. S2803 is performed on the basis of the relation. Even in the case where S2801 is performed, if it is not necessary to change the first threshold value (for example, if a change in the correction error is small enough not to change the first threshold value), S2803 may be skipped.

Figure 29:
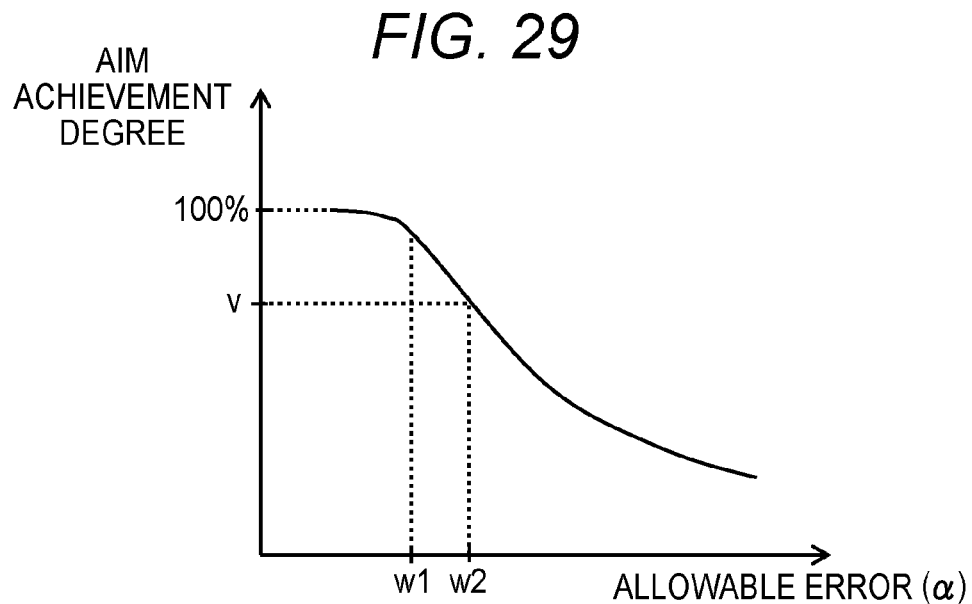
FIG. 29 shows an example of a relation between an aim achievement degree and an allowable error.

According to the second error adjustment processing, it can be expected that the storage capacity of excessive specifications can be reduced as compared with the aim achievement degree desired by the user. For example, as shown in FIG. 29, if the current allowable error is w1 though the aim achievement degree desired by the user is v, data with excessively high precision is stored for the user. Therefore, by increasing the allowable error from w1 to w2 corresponding to the aim achievement degree v, the accuracy of the data set group restored from the data model is lowered, but it can be expected that the aim achievement degree desired by the user is maintained and the storage capacity is reduced.

Figure 30:
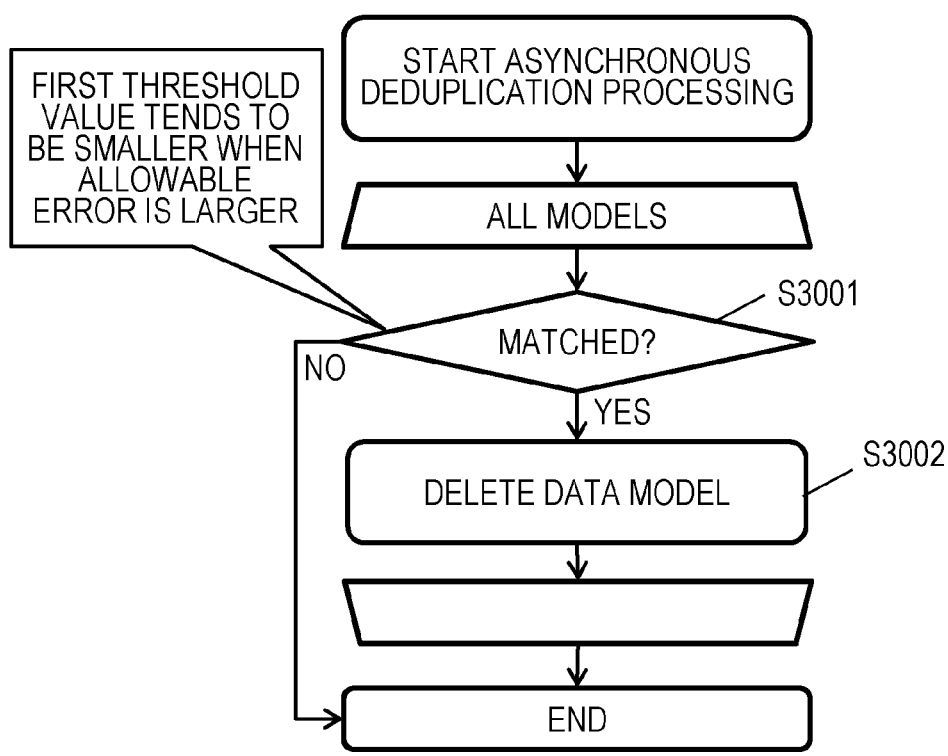
FIG. 30 shows a flow of asynchronous deduplication processing.
Figure 31:
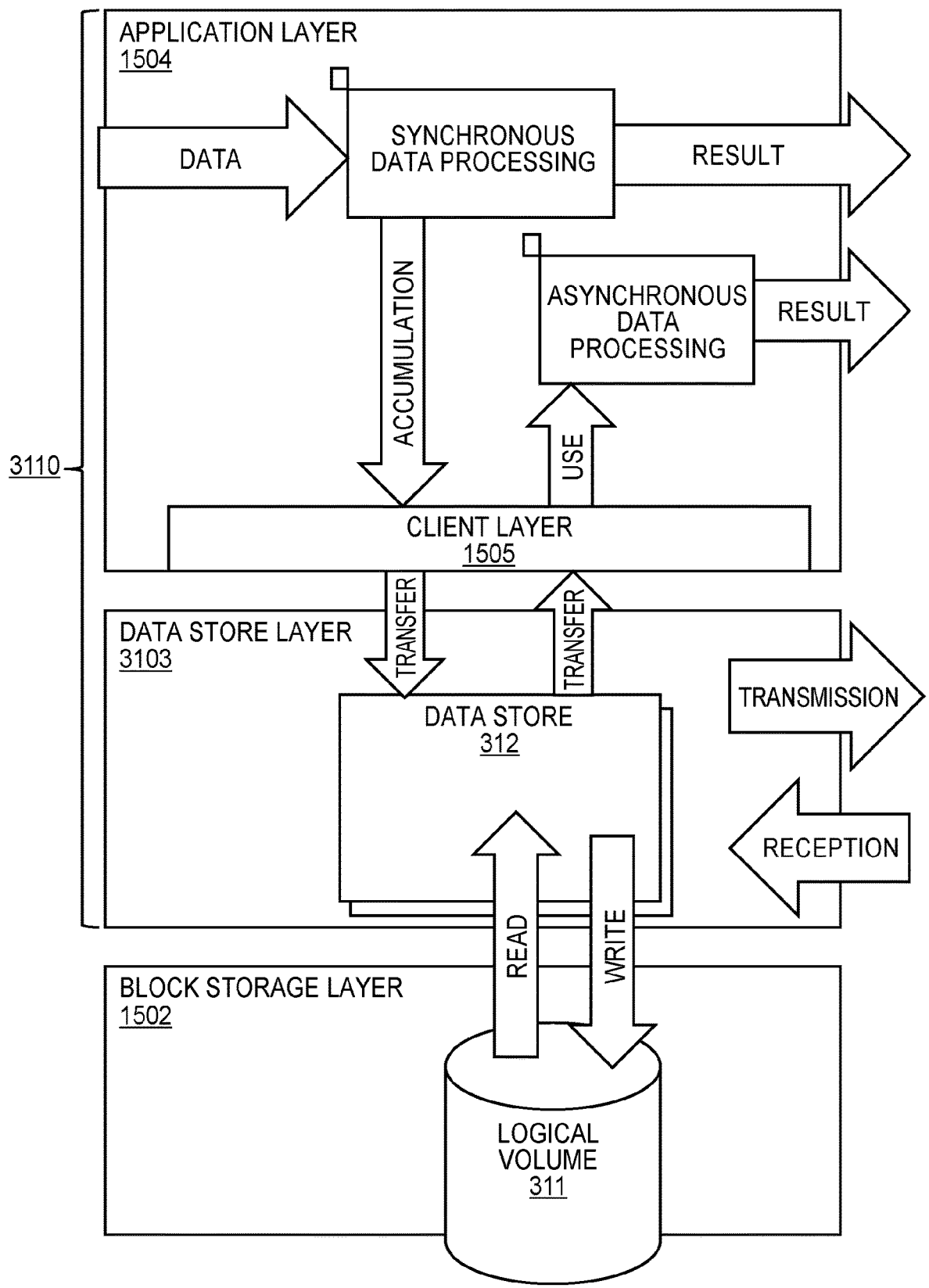
FIG. 31 shows a logical hierarchical structure of a system according to a third embodiment.

FIG. 30 shows a flow of asynchronous deduplication processing.

As described above, the first threshold value used in the matching determination can be decreased by increasing the correction error or the allowable error. Therefore, even if it is not determined that there is a matching data model in the accumulation processing, the matching data model can exist after a lapse of time from the accumulation processing. By performing the asynchronous deduplication processing regularly or irregularly, a data model corresponding to the matching data model is found and the found data model is deleted. As a result, the data amount is reduced. The asynchronous deduplication processing may be performed by both the data store layer 1503 and the client layer 1505. However, in this embodiment, the asynchronous deduplication processing is performed by the data store layer 1503.

The data store layer 1503 performs S3001 and S3002 for each data model registered in the model table 1601. Hereinafter, one data model is taken as an example (in the description of FIG. 30, "target data model").

The data store layer 1503 performs matching determination on whether or not a matching data model to be a data model in which a matching degree with the target data model is equal to or larger than the first threshold value is stored in the model table 1601 (S3001).

When the result of the matching determination in S3001 is true (S3002), the data store layer 1503 deletes any one of the target data model and the matching data model from the model table 1601 and updates the tables 401 and 402 (S3002). For example, in updating of the key conversion table 401, the data store layer 1503 deletes the model ID of the deleted data model and associates the key and the input vector of the deleted data model with the key of the remaining data model. In addition, for example, in the updating of the model hash table 402, the data store layer 1503 deletes the record corresponding to the deleted data model. That is, the data model is deleted, but the input vector and the key of the deleted data model are associated with the remaining data model.

A result of the deduplication processing by the data store layer 1503 may be applied to both the client layer 1505 and the block storage layer 1502. For example, the data store layer 1503 may notify the client layer 1505 of the result of the deduplication processing (information including a set of the model ID of the deleted data model and the model ID of the remaining data model) and the client layer 1505 may update the tables 1701 to 1703, on the basis of the result notification of which is provided. In addition, the data store layer 1503 may transmit a deletion request specifying the address (at least a part of the key) of the deleted data model to the block storage layer 1502 and the block storage layer 1502 may delete the data at the address specified by the deletion request.

In this embodiment, the second threshold value (threshold value used in similarity determination) may also be a variable value and may tend to be smaller when the allowable error is larger.

Third Embodiment

A third embodiment will be described. At this time, a different point with the first embodiment or the second embodiment is mainly described and description of a common point with the first embodiment or the second embodiment is omitted or simplified.

FIG. 26 shows a logical hierarchical structure of a system according to the third embodiment.

In the third embodiment, at least an edge node unit 250A of the edge node unit 250A and a core node unit 250B forms a storage system 3110. The edge node unit 250A provides an application layer 1504 (client layer 1505) and a data store layer 3103. Hereinafter, it is assumed that the edge node unit 250A includes one edge node 201A and the core node unit 250B includes one core node 201B. The data store layer 3103 in the edge node 201A exchanges data with the core node 201B. The exchange of the data with the core node 201B may be performed by another layer such as a block storage layer 1502 or the client layer 1505, instead of or in addition to the data store layer 3103.

Figure 32:
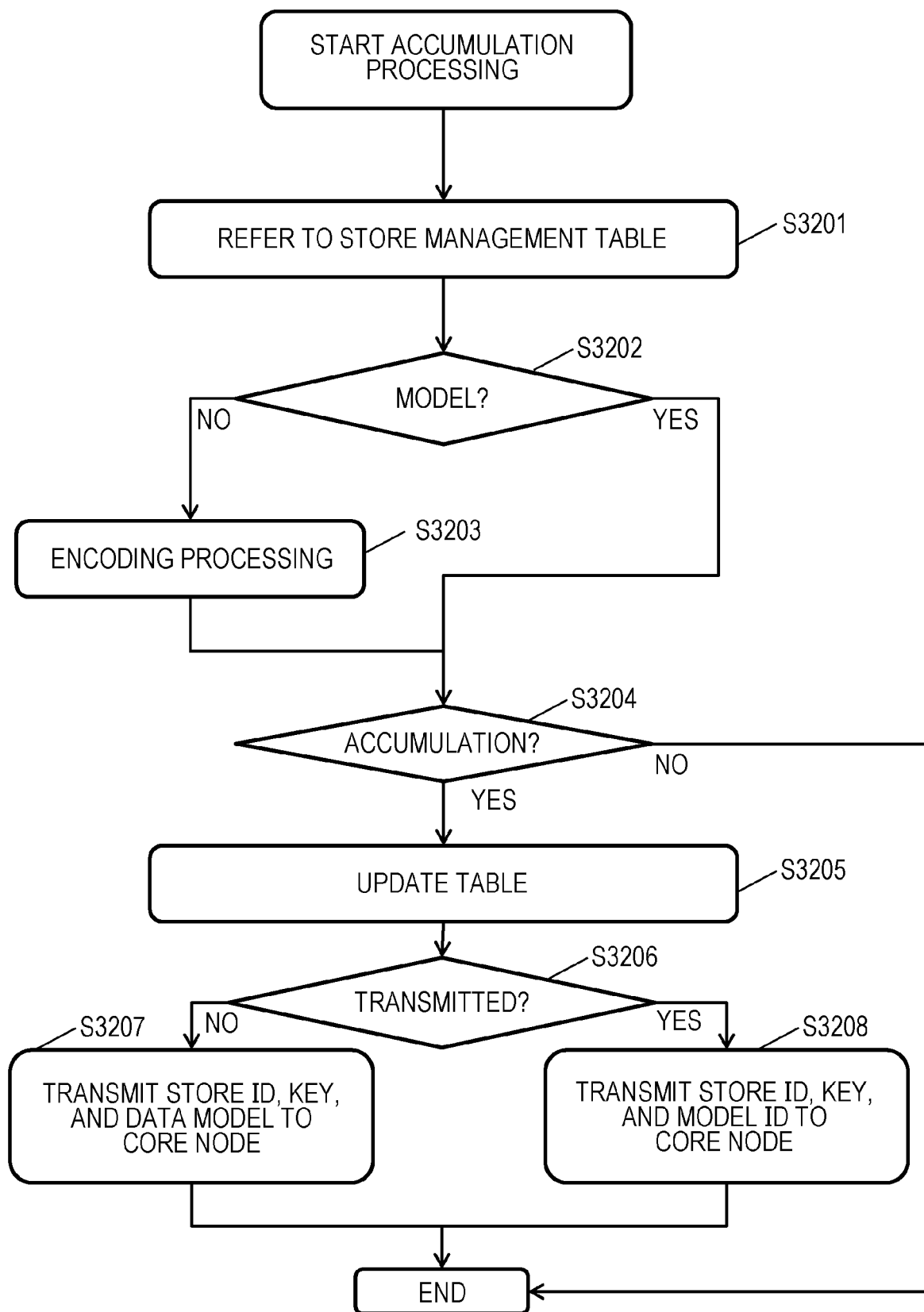
FIG. 32 shows a flow of accumulation processing according to the third embodiment.

FIG. 32 shows a flow of accumulation processing.

The data store layer 3103 performs the same processing as S2001 to S2005 (S3201 to S3205).

In the case of updating a model table 1601, the data store layer 3103 determines whether or not the same data model has been transmitted to the core node 201B (S2706). For example, a state of whether or not transmission has been completed may be managed for each address and the determination of S2706 may be performed on the basis of the state.

When a determination result in S2706 is false (S2706: N), the data store layer 3103 transmits a store ID, a key, and a data model to the core node 201B (S2707). In this case, in the core node 201B, the data model is stored in a model table 1601.

If the determination result in S2706 is true (S2706: Y), the data store layer 3103 transmits the store ID, the key, and the model ID to the core node 201B (S2708). In this case, in the core node 201B, the transmitted key is added to a key (key in a key conversion table 401) corresponding to the same model ID as the model ID. As such, when the same data model already exists in the core node 201B, the model ID is transmitted instead of the data model. As a result, an amount of data transferred from the edge node 201A to the core node 201B can be reduced.

Although the several embodiments are described above, these embodiments are examples for explaining the present invention and the scope of the present invention is not limited to these embodiments. The present invention can be carried out in various other forms.

For example, the first to third embodiments can be summarized as follows.

The "difference information" is information (array) representing an error between an output data set group (generated value) from a data model and an original data set group (data set group to be written) and is an accurate difference value because it is reversible.

The "error information" is information (array) representing the error between the output data set group from the data model and the original data set group on the log scale and it is not accurate because it is irreversible (If the allowable error is zero, it is accurate). However, compression is effective.

The "data model" is a model as a generation rule of a data set group and corresponds to an execution subject. The data model may be a general term for a new data model, a difference data model, a similar data model, and a matching data model.

The "data set" is an element of a data set group.

The "data set group" is a group of data sets corresponding to one data model.

The "matching degree" is an index representing similarity.

The "new data model" is a newly generated data model (not a difference data model).

The "difference data model" is a data model (data model smaller in size than the new data model and different from the difference information) to be connected to the generated data model (typically, a similar data model). The generated data model may be the "difference data model". That is, one difference data model may include a model ID of another difference data model.

For the target data model, the "matching data model" is any one (for example, a data model having the largest matching degree) among the data models in which the matching degree with the target data model is equal to or larger than the first threshold value. When there is a matching data model, a new data model is not generated and the matching data model is shared by two or more keys.

For the target data model, the "similar data model" is any one of the data models in which the degree of matching with the target data model is less than the first threshold value and equal to or larger than the second threshold value (for example, the data model having the largest matching degree), which is a data model to be the base of the difference data model. As described above, the similar data model may be another difference data model. When neither the matching data model nor the similar data model exists for the target data model (that is, when a matching degree of any existing data model with the target data model is less than the second threshold value), a new data model is generated.

As described above, the difference data model may correspond to both the matching data model and the similar data model. In other words, the data model specified as the matching data model or the similar data model may be the difference data model.

For example, key:input vector may be 1:1 or many 1. The latter is because the same data set group may be set as a write target (that is, because the input vector may be the same in addition to the data model).

For example, key:model ID (data model) may be 1:1 or many:1. That is, two or more different keys may share the same model ID (data model).

What is claimed is:

1. A storage system comprising:
   a storage unit including at least one of a memory unit to be one or more memories and a PDEV (non-volatile physical storage device) unit to be one or more PDEVs; and
   a processor unit to be one or more processors connected to the storage unit, wherein
   a data model which is generated in encoding processing including processing for generating the data model which is associated with a key of data set group is available,
   the data model representing regularity of the data set group is a neural network whose input is one or more input values and whose output is the data set group, and
   in read processing of a data set group to be read, the processor unit is configured to
   (R1) acquire a data model corresponding to a key including an address of a read source,
   (R2) perform decoding processing including processing for restoring a data set group using the acquired data model, and
   (R3) return the data set group restored in the decoding processing.

2. The storage system according to claim 1, wherein
   in write processing of a data set group to be written to be one or more data sets to be written, the processor unit is configured to
   (W1) perform encoding processing including processing for generating a data model representing regularity of the data set group to be written, the data model being a neural network whose input is one or more input values and whose output is the data set group, and
   (W2) store the data model which is available and which is generated in the encoding processing and associated with a key of the data set group to be written.

3. The storage system according to claim 2, wherein the processor unit is configured to
   perform matching determination on whether or not a matching data model to be a data model in which a matching degree with the data model of the data set group to be written is equal to or more than a first threshold value has been stored in the storage unit, and
   in the case where a result of the matching determination is true,
   in the write processing, instead of performing (W2), associate the matching data model with a key of the data set group to be written, or
   deletes any one of the data model of the data set group to be written and the matching data model from the storage unit.

4. The storage system according to claim 3, wherein
   in the case where the result of the matching determination is false,
   if there is a similar data model to be a data model in which a matching degree with the data model of the data set group to be written is less than the first threshold value and equal to or more than a second threshold value, the processor unit is configured to generate a data model including a model ID of the similar data model and difference data between the similar data model and the data model of the data set group to be written, as the data model of the data set group to be written.

5. The storage system according to claim 2, wherein
   when an I/O load for an address of a write destination of the data set group to be written is less than a predetermined value or a load of the processor unit is less than the predetermined value, the processor unit is configured to perform (W1) for the data set group to be written.

6. The storage system according to claim 2, wherein
   the encoding processing in (W1) includes processing for generating difference information to be a difference between the data set group to be written and a data set group output from the data model, in (W2), the processor unit is configured to write the data model associated with the key of the data set group to be written and the generated difference information to the storage unit, and the data set group restored in the decoding processing in (R2) is a data set group obtained by reflecting the difference information associated with the data model in the data set group output from the data model.

7. The storage system according to claim 2, wherein the encoding processing in (W1) includes processing for generating error information to be information based on an error between the data set group to be written and a data set group output from the data model and an allowable error, in (W2), the processor unit is configured to write the data model associated with the key of the data set group to be written and the generated error information to the storage unit, and the data set group restored in the decoding processing in (R2) is a data set group obtained by correcting the data set group output from the data model using the error information associated with the data model.

8. The storage system according to claim 7, wherein the storage unit includes a memory unit to be one or more memories, the processor unit is configured to provide a front-end layer writing the input data set group to be written to the memory unit, and the front-end layer is configured to read a data model of a data set group to be read to the memory unit through a back-end layer writing the data model of the data set group to be written to the PDEV unit to be one or more PDEVs, and perform (R2).

9. The storage system according to claim 7, wherein for each data model, the processor unit is configured to compress the error information and writes the error information to the storage unit, for each data model, the error information includes one or more correction values corresponding to one or more output data sets to be one or more data sets forming a data set group output from the data model, when a correction error increases, a correction value corresponding to the increased correction error approaches a predetermined value and/or when the allowable error increases, each of one or more correction values approaches the predetermined value, an output data set in which an error is within a range of the allowable error is corrected on the basis of the error and the range of the allowable error and an error of the corrected output data set is the correction error for the output data set, the processor unit is configured to perform at least one of first error adjustment processing and second error adjustment processing regularly or irregularly, for at least one data model stored in the storage unit, the first error adjustment processing includes processing for increasing the correction error of an output data set having the correction error among one or more output data sets to be one or more data sets forming a data set group output from the data model, within the range of the allowable error, according to a predetermined rule, processing for decompressing the error information corresponding to the data model, processing for updating the decompressed error information on the basis of the increased correction error, and processing for compressing the updated error information and writing the error information, and for at least one data model stored in the storage unit, the second error adjustment processing includes processing for increasing the allowable error corresponding to the data model, processing for decompressing error information corresponding to the data model, processing for updating the decompressed error information on the basis of the increased allowable error, and processing for compressing the updated error information and writing the error information.

10. The storage system according to claim 9, wherein the processor unit is configured to perform matching determination on whether or not a matching data model to be a data model in which a matching degree with the data model of the data set group to be written is equal to or more than a first threshold value has been stored in the storage unit, in the case where a result of the matching determination is true, the processor unit is configured to associate, in the write processing, instead of (W2), the matching data model with the key of the data set group to be written, or delete any one of the data model of the data set group to be written and the matching data model from the storage unit, and the first threshold value is a variable value and is smaller when the allowable error is larger.

11. The storage system according to claim 1, wherein the data model is a data model generated in encoding processing whose output is the data set group to be read.

12. The storage system according to claim 1, wherein the data model includes a data model generated in encoding processing whose output is a data set group being different from the data set group to be read.

13. The storage system according to claim 1, wherein in search processing, the processor unit is configured to search a target data model to be a data model conforming to a search condition and return a key associated with the found target data model.

14. The storage system according to claim 1, wherein each data model is based on values obtained by normalizing a maximum value and a minimum value in a data set group corresponding to the data model.

15. The storage system according to claim 1, further comprising:

an edge node unit to be one or more edge nodes connected to a core node unit to be one or more core nodes, wherein the edge node unit has the processor unit and the storage unit, and the processor unit is configured to perform transmission determination to be determination on whether or not the same data model as the data model of the data set group to be written has been transmitted to the core node unit, transmit the key of the data set group and the data model to the core node unit when a result of the transmission determination is false, and transmit the key of the data set group and a model ID of the data model to the core node unit when the result of the transmission determination is true.

16. A storage control method comprising:
in read processing of a data set group to be read,
(R1) acquiring a data model corresponding to a key including an address of a read source,
(R2) performing decoding processing including processing for restoring a data set group using the acquired data model, and
(R3) returning the data set group restored in the decoding processing,
wherein the data model which is generated in encoding processing including processing for generating the data model which is associated with a key of data set group is available.

17. The storage control method according to claim 16, further comprising:
searching a target data model to be a data model conforming to a search condition and returning a key associated with the found target data model.

18. The storage control method according to claim 16, further comprising:
obtaining values for each data model by normalizing a maximum value and a minimum value in a data set group corresponding to the data model.

19. A storage system comprising:
a storage unit including at least one of a memory unit to be one or more memories and a PDEV (non-volatile physical storage device) unit to be one or more PDEVs; and
a processor unit to be one or more processors connected to the storage unit, wherein
a data model which is generated in encoding processing including processing for generating the data model which is associated with a key of data set group is available,
the data model representing pattern of the data set group is a neural network whose input is one or more input values and used for restoring the dataset group, and
in read processing of a data set group to be read, the processor unit is configured to
(R1) get a data model corresponding to a read source,
(R2) perform decoding processing including processing for restoring a data set group using the gotten data model, and
(R3) return the data set group restored in the decoding processing.

20. The storage system according to claim 19, wherein
in write processing of a data set group to be written to be one or more data sets to be written, the processor unit is configured to
(W1) perform encoding processing including processing for generating a data model representing pattern of the data set group to be written, the data model being a neural network whose input is one or more input values and used for restoring the dataset group, and
(W2) store the data model which is available and which is generated in the encoding processing and associated with a key of the data set group to be written.

21. The storage system according to claim 19, wherein
the data model is a data model generated in encoding processing whose output is the data set group to be read.

22. The storage system according to claim 19, wherein
the data model includes a data model generated in encoding processing whose output is a data set group being different from the data set group to be read.

23. The storage system according to claim 19, wherein
in search processing, the processor unit is configured to search a target data model to be a data model conforming to a search condition and return a key associated with the found target data model.

24. The storage system according to claim 19, wherein
each data model is based on values obtained by normalizing a maximum value and a minimum value in a data set group corresponding to the data model.

25. The storage system according to claim 19, further comprising:
an edge node unit to be one or more edge nodes connected to a core node unit to be one or more core nodes,
wherein the edge node unit has the processor unit and the storage unit, and the processor unit is configured to
perform transmission determination to be determination on whether or not the same data model as the data model of the data set group to be written has been transmitted to the core node unit,
transmit the key of the data set group and the data model to the core node unit when a result of the transmission determination is false, and
transmit the key of the data set group and a model ID of the data model to the core node unit when the result of the transmission determination is true.

26. A storage control method comprising:
providing a storage system including:
a storage unit including at least one of a memory unit to be one or more memories and a PDEV (non-volatile physical storage device) unit to be one or more PDEVs; and
a processor unit to be one or more processors connected to the storage unit,
wherein a data model which is generated in encoding processing including processing for generating the data model which is associated with a key of data set group is available, and
the data model representing pattern of the data set group is a neural network whose input is one or more input values and used for restoring the dataset group, and
in read processing of a data set group to be read,
(R1) getting a data model corresponding to a read source,
(R2) performing decoding processing including processing for restoring a data set group using the gotten data model, and
(R3) returning the data set group restored in the decoding processing.

* * * * *